United States Patent
Yamada et al.

(10) Patent No.: US 12,241,738 B2
(45) Date of Patent: Mar. 4, 2025

(54) DETECTION SIGNAL PROCESSING APPARATUS AND DETECTION SIGNAL PROCESSING METHOD FOR EDDY CURRENT SENSOR

(71) Applicant: EBARA CORPORATION, Tokyo (JP)

(72) Inventors: Hiroto Yamada, Tokyo (JP); Taro Takahashi, Tokyo (JP); Hiroaki Shibue, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 194 days.

(21) Appl. No.: 17/839,350

(22) Filed: Jun. 13, 2022

(65) Prior Publication Data

US 2022/0412715 A1 Dec. 29, 2022

(30) Foreign Application Priority Data

Jun. 28, 2021 (JP) .................................. 2021-106668

(51) Int. Cl.
*G01B 7/06* (2006.01)
*B24B 37/005* (2012.01)

(52) U.S. Cl.
CPC ............ *G01B 7/105* (2013.01); *B24B 37/005* (2013.01)

(58) Field of Classification Search
CPC ...... B24B 37/005; G01B 7/105; G01B 7/107; G01B 1/00; G01B 3/00; G01B 5/00; G01B 7/00; G01B 9/00; G01B 11/00; G01B 13/00; G01B 15/00; G01B 17/00; G01B 21/00; G01B 2210/00; G01B 2290/00
See application file for complete search history.

(56) References Cited

U.S. PATENT DOCUMENTS

| | | | |
|---|---|---|---|
| 6,255,794 B1 | 7/2001 | Staebler | |
| 6,433,541 B1* | 8/2002 | Lehman | G01N 27/72 324/207.16 |
| 2005/0189939 A1 | 9/2005 | Obama et al. | |
| 2015/0262893 A1* | 9/2015 | Nakamura | H01L 22/26 438/10 |
| 2018/0114678 A1* | 4/2018 | Ohashi | H01F 7/064 |
| 2020/0016722 A1 | 1/2020 | Nakamura | |

(Continued)

FOREIGN PATENT DOCUMENTS

| | | |
|---|---|---|
| JP | S54-034278 A | 3/1979 |
| JP | H10-253470 A | 9/1998 |

(Continued)

OTHER PUBLICATIONS

KR 20190078519 A Takahashi Magnetic Element and Eddy Current Type Sensor Using the Same (Year: 2019).*

*Primary Examiner* — Feba Pothen
*Assistant Examiner* — Brent J Andrews
(74) *Attorney, Agent, or Firm* — BakerHostetler

(57) ABSTRACT

There is provided a detection signal processing circuit and a detection signal processing method for an eddy current sensor that are less easily influenced by a change in ambient environment than conventional technologies. A detection signal processing apparatus includes a converter configured to convert a first analog signal output by a detection coil into a first digital signal, a converter configured to convert a second analog signal output by a dummy coil into a second digital signal, and a detector which is a digital signal processing circuit configured to detect the first digital signal and the second digital signal.

11 Claims, 15 Drawing Sheets

(56) References Cited

U.S. PATENT DOCUMENTS

2021/0199415 A1 7/2021 Yamada et al.
2022/0063056 A1 3/2022 Abe et al.

FOREIGN PATENT DOCUMENTS

| JP | 2000-088507 A | | 3/2000 | |
|----|---------------|---|--------|---|
| JP | 2005-241594 A | | 9/2005 | |
| JP | 2007-225303 A | | 9/2007 | |
| JP | 2009-287930 A | | 12/2009 | |
| JP | 2011-138399 A | | 7/2011 | |
| JP | 2020-011314 A | | 1/2020 | |
| JP | 2021-096117 A | | 6/2021 | |
| KR | 20190078519 A | * | 7/2019 | ............. G01B 7/105 |

* cited by examiner

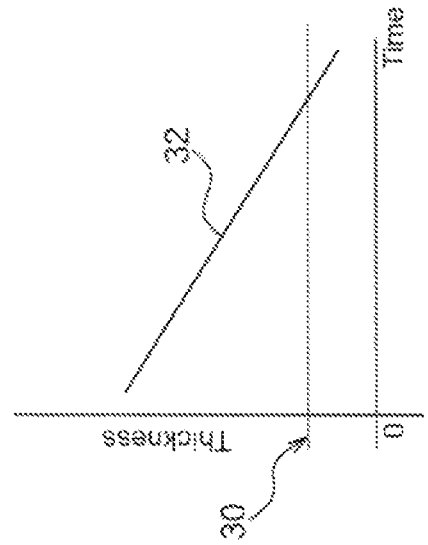
Fig. 4B
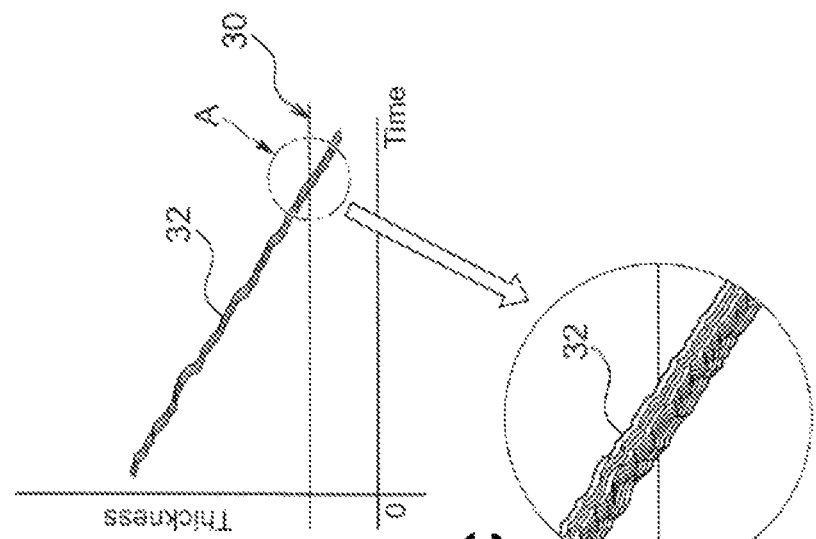
Fig. 4A
Fig. 4C

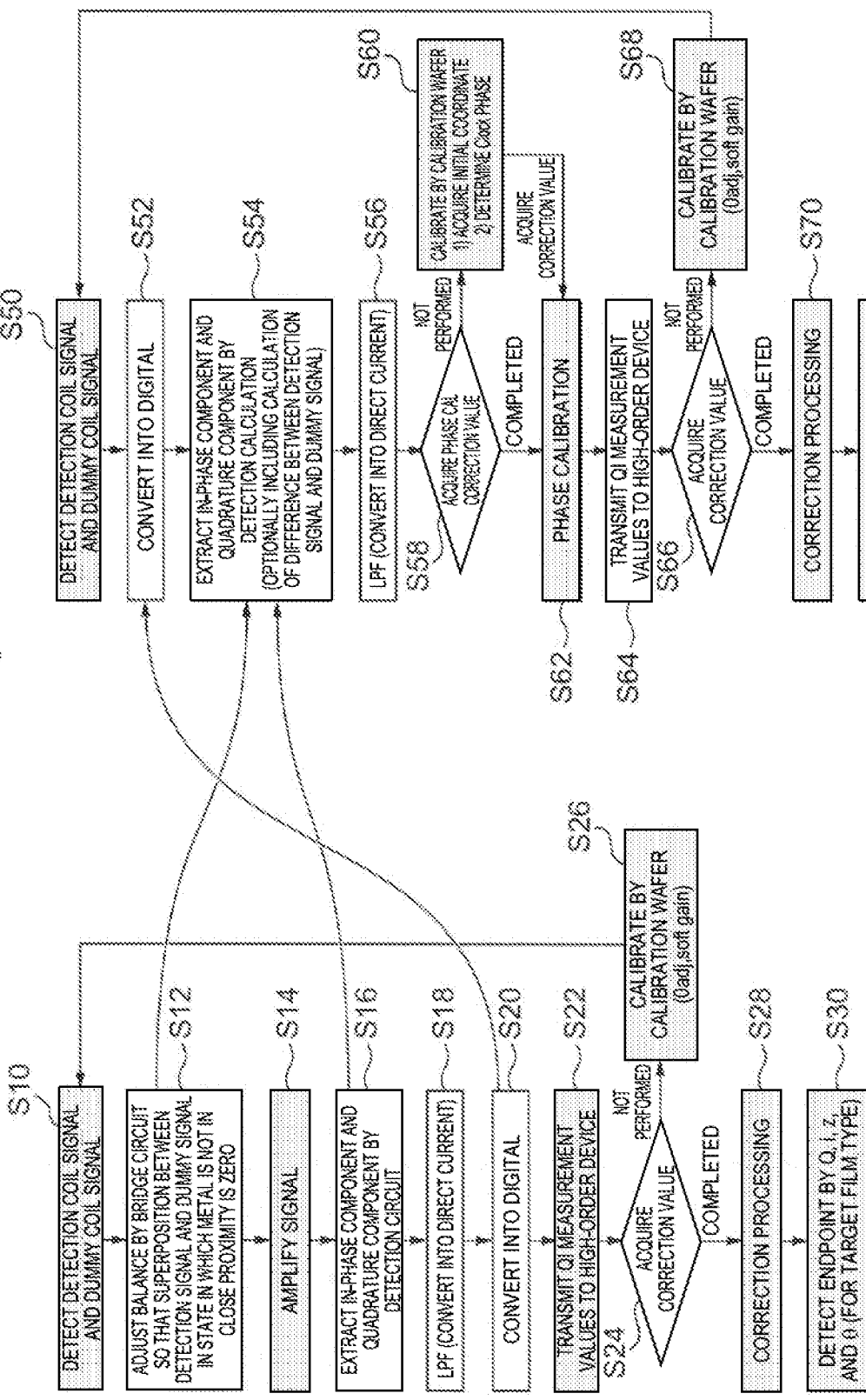

DETECTION SIGNAL PROCESSING APPARATUS AND DETECTION SIGNAL PROCESSING METHOD FOR EDDY CURRENT SENSOR

TECHNICAL FIELD

The present invention relates to a detection signal processing apparatus and detection signal processing method for an eddy current sensor.

BACKGROUND

An eddy current sensor is used for film thickness measurement, displacement measurement, and the like. As an example, an eddy current sensor for film thickness measurement will be described below. An eddy current sensor for film thickness measurement is used in, for example, a step (polishing step) of manufacturing a semiconductor device. In the polishing step, the eddy current sensor is used as described below. As the density of semiconductor devices increases, finer wires are used in circuits, and the inner-wire distances are becoming narrower. Accordingly, flattening the surface of a semiconductor wafer that is an object to be polished is required, and the polishing is performed by a polishing apparatus as one measure for the flatting method.

The polishing apparatus includes a polishing table for holding a polishing pad for polishing an object to be polished, and a top ring for holding the object to be polished to press it against the polishing pad. Each of the polishing table and the top ring is rotatably driven by a driving module (such as a motor). Liquid (slurry) containing an abrasive is poured onto the polishing pad, and the object to be polished held by the top ring is pressed against it, whereby the object to be polished is polished.

In such a polishing apparatus, when the object to be polished is insufficiently polished, inter-circuit isolation cannot be achieved, which causes a risk of a short circuit while, when the object to be polished is excessively polished, the resistance value increases due to a decreased cross sectional area of wires, or wires themselves are completely removed and the circuit itself is not formed. Therefore, in the polishing apparatus, detection of an optimum polishing endpoint is required.

Such a technology is disclosed in Japanese Patent Laid-Open No. 2020-11314. According to the technology, an eddy current sensor using three coils is used for detecting a polishing endpoint. As illustrated in FIG. 7 in JP No. 2020-11314, a detection coil and a dummy coil among the three coils construct a series circuit, and both ends of the series circuit are connected to a resistor bridge circuit including a variable resistor. Adjusting the balance in the resistor bridge circuit enables a zero point to be adjusted such that, when the film thickness is zero, the output of the resistor bridge circuit is zero. The output of the resistor bridge circuit is input to a synchronous detection circuit, as illustrated in FIG. 8 in JP No. 2020-11314. The synchronous detection circuit extracts, from the input signal, a resistance component (R), a reactance component (Q), an amplitude output (Z) and a phase angle ($\tan^{-1}$ Q/R) corresponding to a change in the film thickness.

According to a detection method using a conventional bridge circuit, the amount of resistance value adjustment in the zero point adjustment is much smaller than the magnitude of the total resistance value forming the bridge circuit. As a result, the temperature change amount of the total resistance value is an unignorable amount, compared with the resistance value adjustment amount in the zero point adjustment. Because of a change in resistance value due to a temperature change, a change in stray capacitance of the resistor and the like, the characteristics of the bridge circuit are sensitively influenced by changes in ambient environment of the resistor. As a result, the above-described zero point easily shifts, which causes a decrease in measurement accuracy of the film thickness. The bridge circuit cancels out a detection signal and a dummy signal to be in a balance state. The signal processing reduces an output signal from the bridge circuit and therefore it is necessary to largely amplify the signal.

However, largely amplifying the signal causes au increase in noise.

One aspect of the present invention has been made to solve the problem described above, and it is an objective to provide a detection signal processing circuit and a detection signal processing method for an eddy current sensor that are less easily influenced by a change in ambient environment than conventional technologies.

SUMMARY OF INVENTION

In order to solve the problem described above, in a first aspect, there is provided a detection signal processing apparatus configured to process a detection signal of an eddy current sensor having an excitation coil configured to form an eddy current in an object to be detected, a first detection coil configured to detect the eddy current formed in the object to be detected, and a dummy coil and/or a second detection coil configured to detect the eddy current, the apparatus comprising a first converter configured to convert a first analog signal output by the first detection coil into a first digital signal, a second converter configured to convert a second analog signal output by the dummy coil into a second digital signal, and/or a third converter configured to convert a third analog signal output by the second detection coil into a third digital signal, and a detector which is a digital signal processing circuit configured to detect the first digital signal, and the second digital signal and/or the third digital signal.

In a second aspect, there is provided the detection signal processing apparatus according to the first aspect, wherein the detector performs synchronous detection using a reference signal to output an obtained impedance, the apparatus comprises a corrector configured to perform correction corresponding to a phase difference between the first digital signal and the reference signal with respect to the impedance obtained by the synchronous detection, in an impedance plane in which a resistance component and a reactance component of the impedance correspond to respective axes of a coordinate system having two orthogonal coordinate axes, the phase difference corresponds to a phase angle of the impedance obtained in a reference state, and the corrector outputs, as an impedance after correction, an impedance corresponding to a point obtained by rotating a point on the impedance plane corresponding to the impedance obtained by the detector according to the phase angle in a predetermined direction on the impedance plane.

In a third aspect, there is provided the detection signal processing apparatus according to the first aspect, wherein the detector performs synchronous detection using a reference signal, the apparatus comprises a phase difference detector configured to detect a phase difference between the first digital signal and the reference signal, and a signal output circuit configured to output at least one of a plurality of the reference signals having phases different from each other, and the signal output circuit is capable of outputting at least one of a plurality of the reference signals on a basis of the phase difference detected by the phase difference detector.

In a fourth aspect, there is provided the detection signal processing apparatus according to any one of the first to third aspects, wherein at least one signal of the first analog signal and the second analog signal and/or the third analog signal is a differential signal.

In a fifth aspect, there is provided the detection signal processing apparatus according to any one of the first to fourth aspects, wherein at least one of the first converter, and the second converter and/or the third converter performs oversampling.

In a sixth aspect, there is provided the detection signal processing apparatus according to any one of the first to fifth aspects, further comprising an exciter configured to supply, to the excitation coil, an excitation signal having jitter not larger than a predetermined value.

In a seventh aspect, there is provided the detection signal processing apparatus according to any one of the first to sixth aspects, further comprising a difference circuit configured to obtain a difference between the first digital signal and the second digital signal.

In an eighth aspect, there is provided the detection signal processing apparatus according to the seventh aspect, the apparatus further comprising an adjuster configured to perform phase adjustment and/or amplitude adjustment between the first digital signal and the second digital signal, wherein the difference circuit obtains a difference between the first digital signal and the second digital signal which are output by the adjuster.

In a ninth aspect, there is provided the detection signal processing apparatus according to any one of the first to sixth aspects, further comprising an adder configured to add the first digital signal and the third digital signal.

In a tenth aspect, there is provided a detection signal processing apparatus configured to process a detection signal of an eddy current sensor having an excitation coil configured to form an eddy current in an object to be detected, and a detection coil configured to detect the eddy current formed in the object to be detected, the apparatus comprising a detector configured to detect the detection signal, wherein the detector performs synchronous detection using a reference signal to output an obtained impedance, and a corrector configured to perform correction corresponding to a phase difference between the detection signal and the reference signal with respect to the impedance obtained by the synchronous detection, wherein in an impedance plane in which a resistance component and a reactance component of the impedance correspond to respective axes of a coordinate system having two orthogonal coordinate axes, the phase difference corresponds to a phase angle of the impedance obtained in a reference state, and the corrector outputs, as an impedance after correction, an impedance corresponding to a point obtained by rotating a point on the impedance plane corresponding to the impedance obtained by the detector according to the phase angle in a predetermined direction on the impedance plane.

In an eleventh aspect, there is provided a detection signal processing apparatus configured to process a detection signal of an eddy current sensor having an excitation coil configured to form an eddy current in an object to be detected, and a detection coil configured to detect the eddy current formed in the object to be detected, the apparatus comprising a detector configured to detect the detection signal, wherein the detector performs synchronous detection using a reference signal, a phase difference detector configured to detect a phase difference between the detection signal and the reference signal, and a signal output circuit configured to output at least one of a plurality of the reference signals having phases different from each other, wherein the signal output circuit is capable of outputting at least one of a plurality of the reference signals on a basis of the phase difference detected by the phase difference detector.

In a twelfth aspect, there is provided a polishing apparatus having the detection signal processing apparatus according to any one of the first to eleventh aspects and configured to polish the object to be detected, the polishing apparatus comprising a polishing mechanism configured to polish the object to be detected, the eddy current sensor configured to form the eddy current in the object to be detected and detect the formed eddy current to measure a film thickness of the object to be detected, and a film thickness calculator configured to obtain the film thickness from a signal output by the detector.

In a thirteenth aspect, there is provided a detection signal processing method of processing a detection signal of an eddy current sensor having an excitation coil configured to form an eddy current in an object to be detected, a first detection coil configured to detect the eddy current formed in the object to be detected, and a dummy coil and/or a second detection coil configured to detect the eddy current, the method comprising converting a first analog signal output by the first detection coil into a first digital signal, converting a second analog signal output by the dummy coil into a second digital signal, and/or converting a third analog signal output by the second detection coil into a third digital signal, and detecting the first digital signal, and the second digital signal and/or the third digital signal by a digital signal processing circuit.

BRIEF DESCRIPTION OF DRAWINGS

FIGS. 4A-4C are diagrams illustrating a temporal change in a measurement value of a film thickness;

FIGS. 15A, 15B illustrate processing flows by a conventional apparatus and a processing flow of the present embodiment.

DESCRIPTION OF EMBODIMENTS

Hereinafter, embodiments according to the present invention will be described with reference to the drawings. It should be noted that like numbers refer to like or corresponding parts in the following embodiments, and repetitive description may be omitted. Furthermore, characteristics described according to the embodiments are also applicable to other embodiments if they do not contradict each other.

Figure 1:
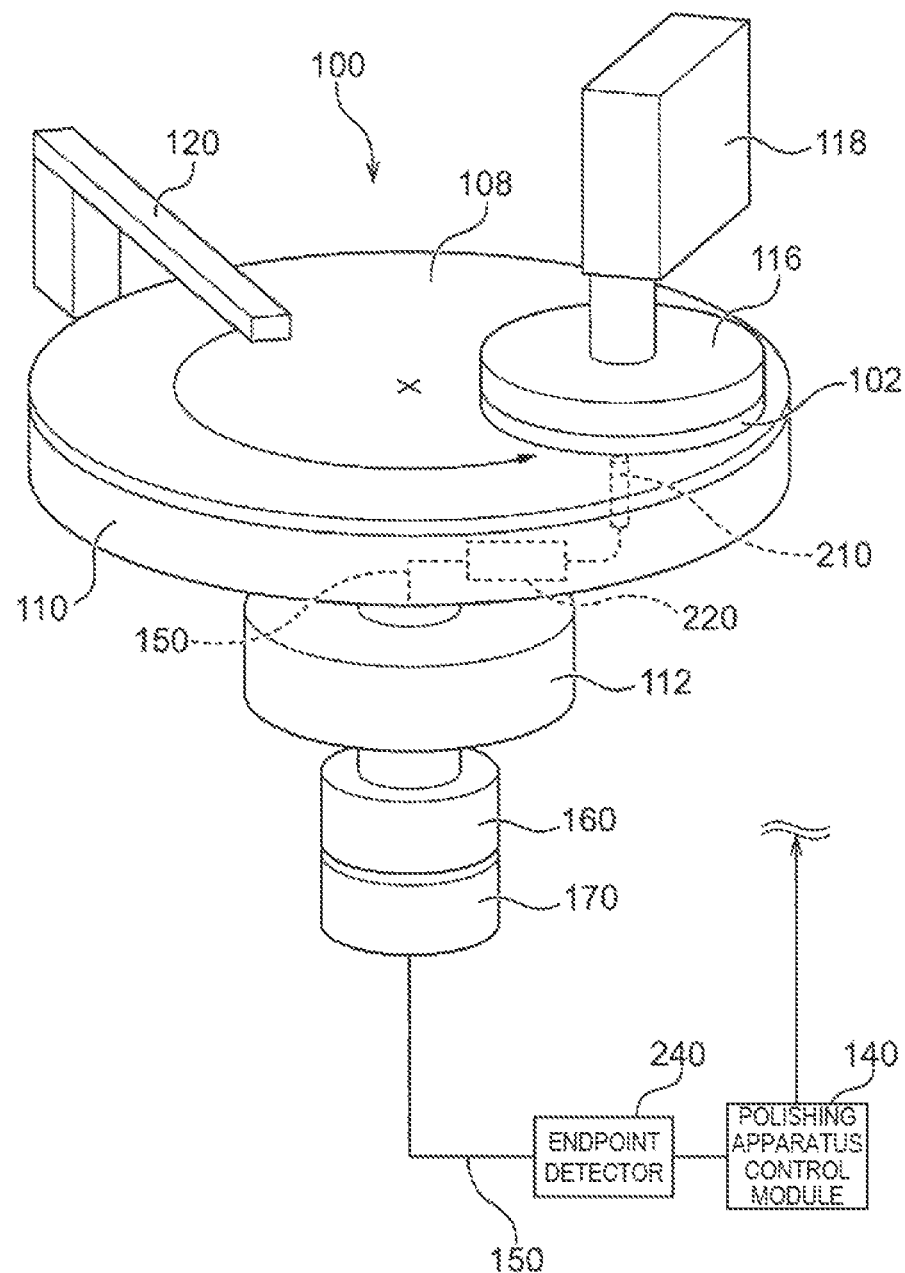
FIG. 1 is a schematic diagram illustrating an entire configuration of a polishing apparatus.

As illustrated in FIG. 1, a polishing apparatus 100 configured to polish an object to be detected includes a polishing table 110, on a top surface of which a polishing pad 108 for polishing an object to be polished 102 can be mounted, a first electric motor 112 configured to drive the polishing table 110 to rotate, a top ring 116 configured to hold the object to be polished 102, and a second electric motor 118 configured to drive the top ring 116 to rotate. The object to be polished 102 is an object to be detected. Examples of the object to be detected include a substrate such as a semiconductor wafer, and various conductive films formed on the surface of the substrate. The polishing pad 108, the polishing table 110, the first electric motor 112, the top ring 116, and the second electric motor 118 constitute a polishing mechanism configured to polish an object to be detected.

The polishing apparatus 100 includes a shiny line 120 configured to supply a polishing abrasive liquid containing a polishing material to the top surface of the polishing pad 108. The polishing apparatus 100 includes a polishing apparatus control module 140 configured to output various control signals associated with the polishing apparatus 100.

When polishing the object to be polished 102, the polishing apparatus 100 causes the shiny line 120 to supply polishing slurry containing polishing abrasive grains to the top surface of the polishing pad 108 and causes the first electric motor 112 to drive the polishing table 110 to rotate. The polishing apparatus 100 causes the top ring 116 to rotate around an axis of rotation decentered from a rotation shaft of the polishing table 110 and to press, against the polishing pad 108, the object to be polished 102 held to the top ring 116. Thus, the object to be polished 102 is polished and planarized by the polishing pad 108 holding the polishing slurry.

The polishing apparatus 100 includes an eddy current sensor 210 configured to form an eddy current in an object to be detected and detect the formed eddy current, and a detection signal processing apparatus 220 connected to the eddy current sensor 210. A film thickness 150 output by the detection signal processing apparatus 220 is output to an endpoint detector 240 via rotary joint connectors 160 and 170 (or slip rings).

The eddy current sensor 210 will be described. A hole is formed in each of the polishing table 110 and the polishing pad 108 so that the eddy current sensor 210 can be inserted thereinto from the rear surface side of the polishing table 110. The eddy current sensor 210 is inserted into the hole formed in the polishing table 110. In the present embodiment, the detection signal processing apparatus 220 is disposed in the polishing table 110. The detection signal processing apparatus 220 may be integrated with the eddy current sensor 210.

Figure 2:
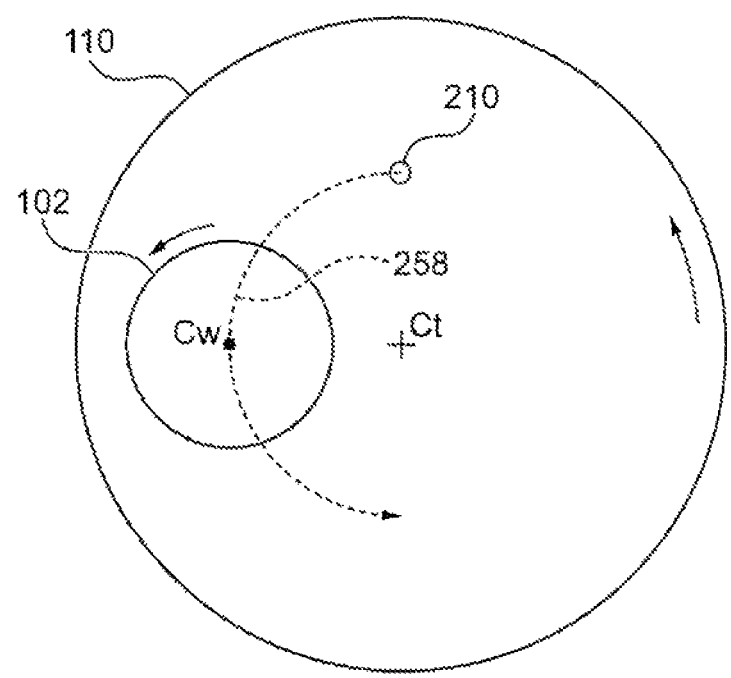
FIG. 2 is a plan view illustrating a relationship among a polishing table, an eddy current sensor, and an object to be polished.

FIG. 2 is a plan view illustrating a relationship among the polishing table 110, the eddy current sensor 210, and the object to be polished 102. As illustrated in FIG. 2, the eddy current sensor 210 is installed at a position to pass through a center Cw of the object to be polished 102 held by the top ring 116 while being polished. A sign Ct denotes a rotation center of the polishing table 110. For example, the eddy current sensor 210 is configured to be capable of continuously detecting a thickness of the object to be polished 102 on a passing locus 258 (scanning line) while the eddy current sensor 210 is passing under the object to be polished 102.

Figure 3A:
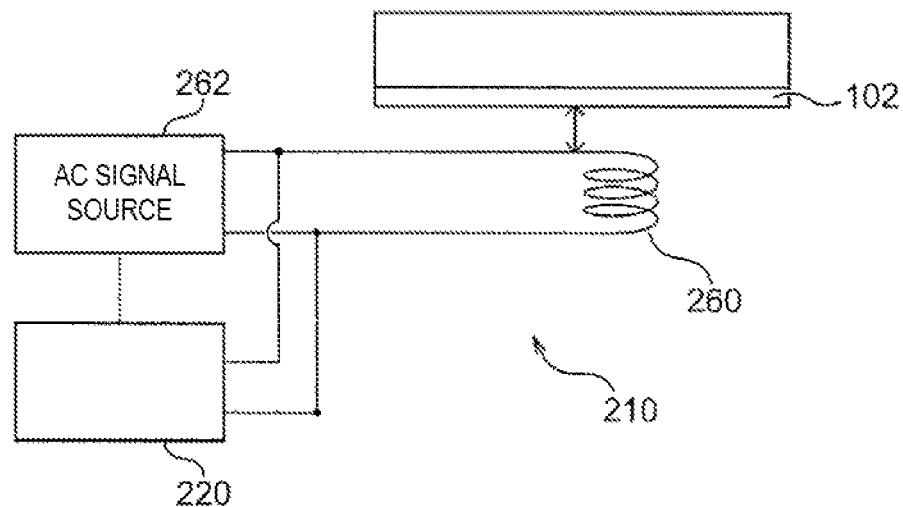
FIGS. 3A, 3B are diagrams illustrating electrical connection of the eddy current sensor.
Figure 3B:
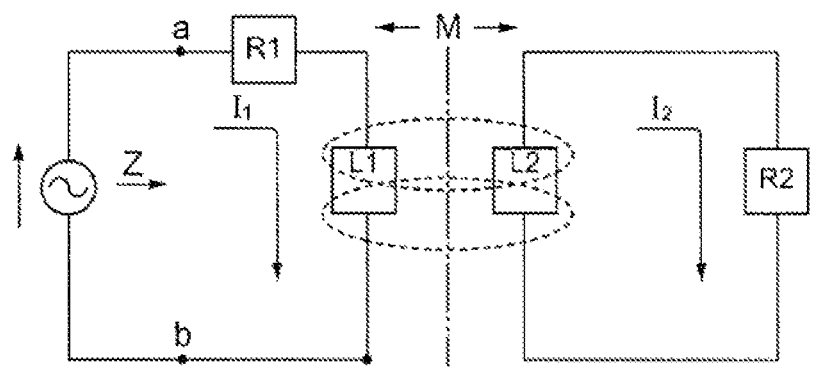

FIG. 3 is a diagram illustrating electrical connection of the eddy current sensor 210. FIG. 3A is a block diagram illustrating electrical connection of the eddy current sensor 210, and FIG. 3B is an equivalent circuit diagram of the eddy current sensor 210.

As illustrated in FIG. 3A, the eddy current sensor 210 includes a sensor coil 260 that is disposed in the vicinity of a metallic film or the like in the object to be polished 102. An AC signal source 262 is connected to the sensor coil 260. The detailed connection between the sensor coil 260 and the AC signal source 262 and the detailed connection between the sensor coil 260 and the detection signal processing apparatus 220 will be described later. The object to be polished 102 has a thin film of Cu, Al, Au, W or the like formed on, for example, a semiconductor wafer. The sensor coil 260 is disposed in the vicinity at a distance of, for example, about 0.5 to 5.0 mm from the object to be polished 102.

There is a frequency type eddy current sensor 210 configured to detect a conductive film on the basis of a change in an oscillation frequency of the AC signal source 262, which is caused by the generation of an eddy current in the object to be polished 102. There is an impedance type eddy current sensor 210 configured to detect a conductive film on a basis of a change in an impedance when viewed from the AC signal source 262, which is caused by the generation of an eddy current in the object to be polished 102. That is, in the frequency type, when, in the equivalent circuit illustrated in FIG. 3B, an eddy current I2 changes, an impedance Z changes, and, as a result, the oscillation frequency of the AC signal source (variable frequency oscillator) 262 changes. The detection signal processing apparatus 220 detects a change in the oscillation frequency so that the eddy current sensor 210 can detect a change of the conductive film. In the impedance type, when, in the equivalent circuit illustrated in FIG. 3B, an eddy current I2 changes, an impedance Z changes, and, as a result, the impedance Z when viewed from the AC signal source (fixed frequency oscillator) 262 changes. The detection signal processing apparatus 220 detects a change in the impedance Z so that the eddy current sensor 210 can detect a change of the conductive film.

In the impedance type eddy current sensor, a real-number component I (resistance component) and an imaginary number component Q (reactance component) of the impedance Z, a phase, and a synthetic impedance Z are extracted. Measurement information of the conductive film is obtained from a frequency F, each component Q, I of the impedance, or the like. The eddy current sensor 210 can be internally contained at a position in the vicinity of an inner surface of the polishing table 110 as illustrated in FIG. 1, and can detect a change of the conductive film from the eddy current flowing in the object to be polished 102 while the eddy current sensor 210 is positioned to face the object to be polished 102 via the polishing pad.

The impedance type eddy current sensor will be specifically described below with reference to FIG. 3B. The AC signal source 262 is an oscillator having a fixed frequency of about 1 to 50 MHz, and, for example, a crystal oscillator is used. Then, an AC voltage supplied by the AC signal source 262 causes a current $I_1$ to flow through the sensor coil 260. When a current flows through the sensor coil 260 disposed in the vicinity of the object to be polished 102, a magnetic flux generated from the sensor coil 260 interlinks with the object to be polished 102. As a result, a mutual inductance M is formed between the sensor coil 260 and the object to be polished 102, and an eddy current $I_2$ flows in the object to be polished 102. Here, R1 indicates a resistance on the primary side including the sensor coil 260, and L1 indicates a self-inductance on the primary side including the sensor coil 260 likewise. On the side of the object to be polished 102, R2 indicates a resistance corresponding to an eddy current loss, and L2 indicates a self-inductance of the object to be polished 102. The impedance Z when the sensor coil 260 side is viewed from terminals a and b of the AC signal source 262 changes due to the influence of the line of magnetic force generated by the eddy current I2.

The detection signal processing apparatus 220 configured to process a detection signal of the eddy current sensor is a digital signal processing circuit. The difference in the influence on the endpoint detection between the conventional analog signal processing circuit and the digital signal processing circuit of the present embodiment is illustrated in FIG. 4 for comparison. FIG. 4A illustrates a temporal change in a measurement value of a film thickness in the conventional analog signal processing circuit. FIG. 4B illustrates a temporal change in a measurement value of a film thickness in the digital signal processing circuit of the present embodiment. In FIG. 4, the horizontal axis indicates a time (second: s), and the vertical axis indicates a film thickness (nanometer: nm). A horizontal line 30 indicates a specified film thickness at a polishing endpoint. As illustrated in FIG. 4A, in the conventional analog signal processing circuit, a film thickness 32 obtained by processing the detection signal of the eddy current sensor is unstable due to large noise. FIG. 4C is an enlarged view of a portion A of FIG. 4A. As illustrated in FIG. 4C, the film thickness 32 has a range at the specified film thickness. A reason why the film thickness 32 is indicated by a plurality of lines is because when the same eddy current sensor is used to polish a plurality of substrates having the same composition, the variation in the endpoint detection accuracy is large because of large noise and the like, and the film thickness 32 cannot result in one line. Such variation in the detection result influences the endpoint detection accuracy.

On the other hand, as illustrated in FIG. 4B, in the digital signal processing circuit, the film thickness 32 is indicated by approximately one line. A reason why the film thickness 32 is indicated by one line is because when the same eddy current sensor is used to polish a plurality of substrates having the same composition, the variation in the endpoint detection accuracy is small because of small noise and the like, and the film thickness 32 can result in one line. In the digital signal processing circuit, the noise is small, and therefore a stable sensor output can be obtained during polishing. To improve the endpoint detection performance, it is desirable that in the case of the same eddy current sensor, the output is the same for the same object to be polished, that is, the stable output is obtained, and in the case of a plurality of eddy current sensors, individual differences among the sensors are reduced. The digital signal processing circuit can improve these points compared to the analog signal processing circuit.

Figure 5:
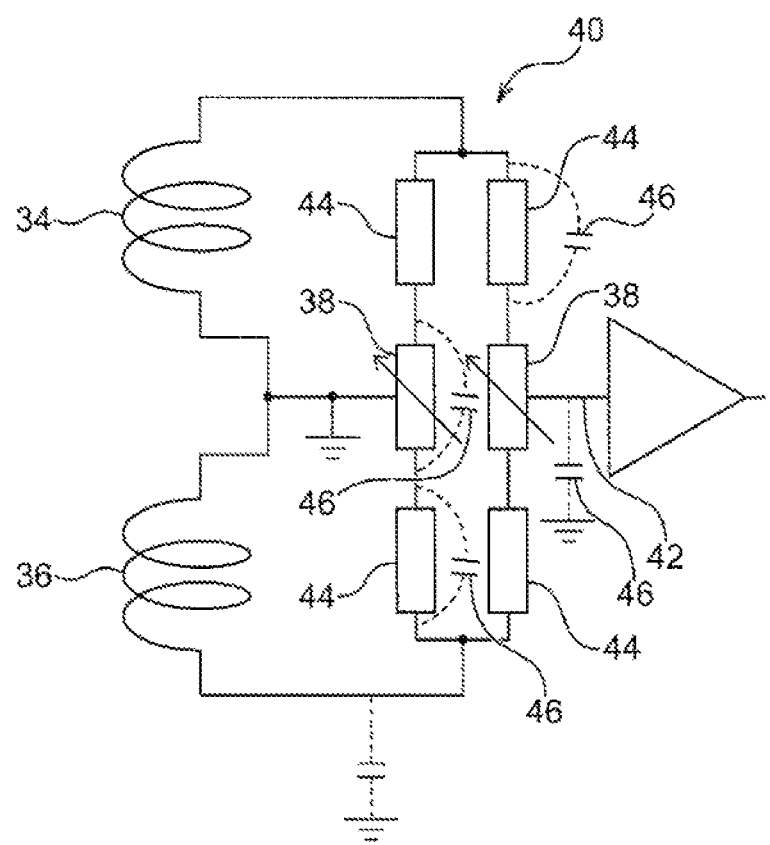
FIG. 5 is a diagram illustrating a bridge circuit used in a conventional analog signal processing circuit.

An example of a reason why the output is not stable in the analog signal processing circuit will be described with reference to FIG. 5. FIG. 5 illustrates a bridge circuit used in the conventional analog signal processing circuit. The sensor coil 260 includes a detection coil 34, a dummy coil 36, and an excitation coil (not illustrated). The detection coil 34 and the dummy coil 36 among the three coils construct a series circuit, and both ends of the series circuit are connected to a resistor bridge circuit 40 including variable resistors 38. Adjusting the balance in the resistor bridge circuit 40 enables a zero point to be adjusted such that, when the film thickness is zero, an output 42 of the resistor bridge circuit 40 is zero.

According to a detection method using a conventional bridge circuit 40, the amount of resistance value adjustment in the zero point adjustment is much smaller than the magnitude of the total resistance value forming the bridge circuit 40.

As a result, the temperature change amount of the total resistance value is an unignorable amount, compared with the resistance value adjustment amount in the zero point adjustment. Because of changes in resistance values of the variable resistors 38 and fixed resistors 44 due to a temperature change, a change in stray capacitance 46 of each resistor and the like, the characteristics of the bridge circuit 40 are sensitively influenced by changes in ambient environment of the resistors. As a result, the above-described zero point easily shifts, which causes a decrease in measurement accuracy of the film thickness.

Figures 6A, 6B:
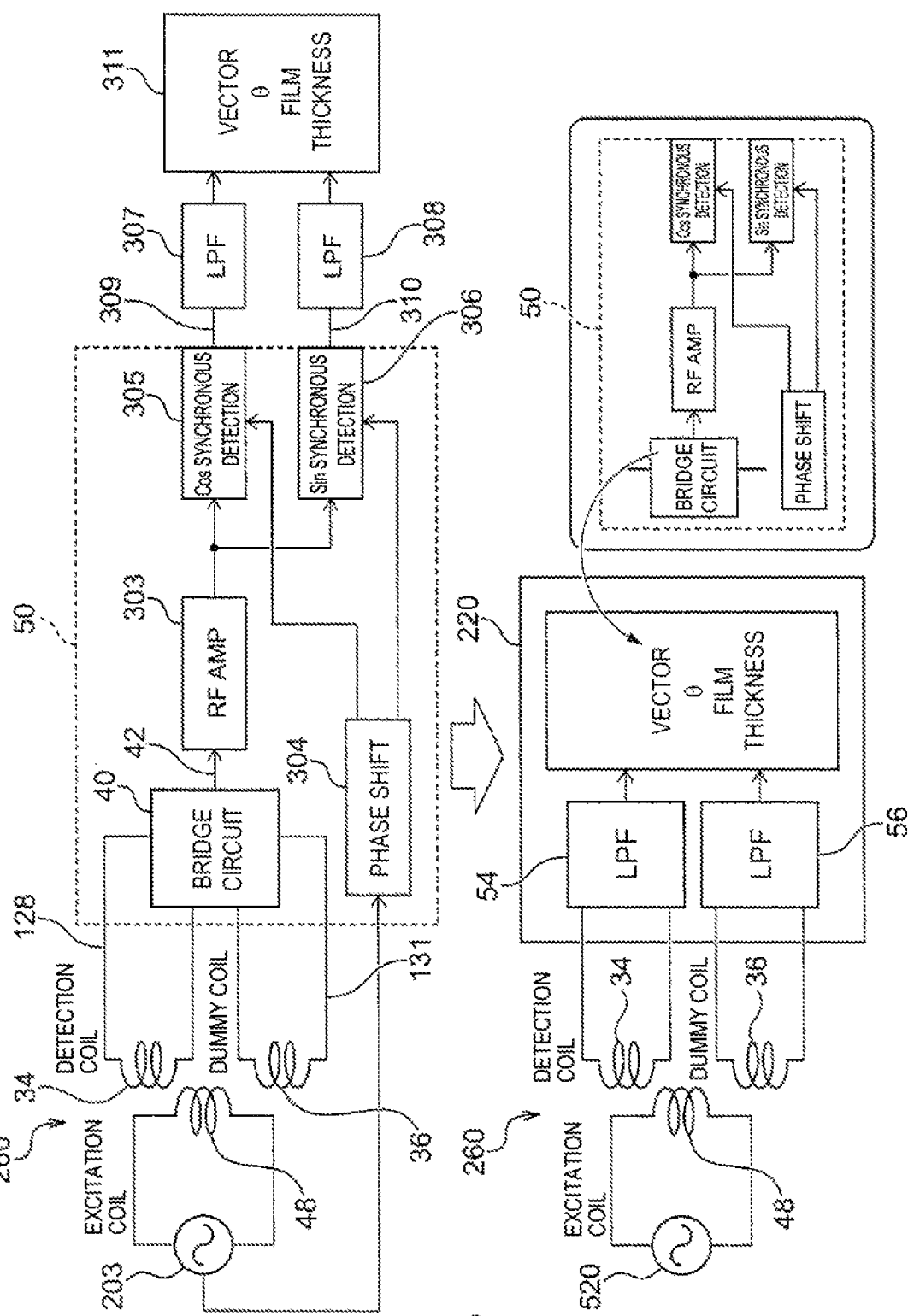
FIGS. 6A, 6B are diagrams illustrating the conventional analog signal processing circuit and a digitized detection signal processing apparatus.

For comparison with the present embodiment, the conventional analog signal processing circuit using the resistor bridge circuit 40 is illustrated in FIG. 6A. The excitation coil 48 of the sensor coil 260 is connected to an AC signal source 203 and generates an alternating magnetic flux to thereby forum an eddy current in the object to be polished 102 disposed in the vicinity of the eddy current sensor 210. The signal source 203 configured to supply an AC signal to the sensor coil 260 disposed in the vicinity of the object to be polished 102 is an oscillator having a fixed frequency consisting of a crystal oscillator. The AC signal source 203 supplies a voltage having a fixed frequency of, for example, 1 to 50 MHz. The AC voltage formed in the signal source 203 is supplied to the excitation coil 48.

Signals 128 and 130 output from the terminals of the sensor coil are output as the output 42 via the resistor bridge circuit 40. The output 42 is input to a coherent detector comprised of a cos synchronous detection circuit 305 and a sin synchronous detection circuit 306 via a high frequency amplifier 303. A cos component (Q component) and a sin component (I component) of the detection signal are extracted from the coherent detector. Here, a phase shift circuit 304 forms two signals of an in-phase component (0°) and a quadrature component (90°) of the signal source 203 from an oscillation signal formed in the signal source 203. These signals are introduced to the sin synchronous detection circuit 306 and the cos synchronous detection circuit 305, respectively, where the above-described synchronous detection is performed.

Unnecessary high frequency components equal to or higher than the signal component, for example, 5 KHz, are removed from the signals subjected to synchronous detection by low-pass filters 307 and 308. The coherent-detected signals are a Q component output 309 which is a cos synchronous detection output and an I component output 310 which is a sin synchronous detection output. Also, a calculation circuit 311 performs a vector calculation to thereby obtain $(Q^2+I^2)^{1/2}$, which is the magnitude of the impedance Z, from the Q component output 309 and the I component output 310. In addition, the calculation circuit 311 performs θ processing to thereby obtain a phase output (θ=tan$^{-1}$Q/I) from the Q component output 309 and the I component output 310 as well. Here, the filters 307 and 308 each are provided to remove noise components of the sensor signal, and cutoff frequencies corresponding to the various filters are set.

The present embodiment illustrated in FIG. 6B is the detection signal processing apparatus 220 in which an analog signal processing circuit 50 and the calculation circuit 311 are digitized which are indicated by the dotted lines in FIG. 6A. It should be noted that the calculation circuit 311 illustrated in FIG. 6A is a digital signal processing apparatus. The detection signal processing apparatus 220 has a function of the calculation circuit 311 and further has a function of calculating a film thickness. Outputs of a detection coil 34 and a dummy coil 36 are input to the detection signal processing apparatus 220 via low-pass filters 54 and 56.

Figure 7:
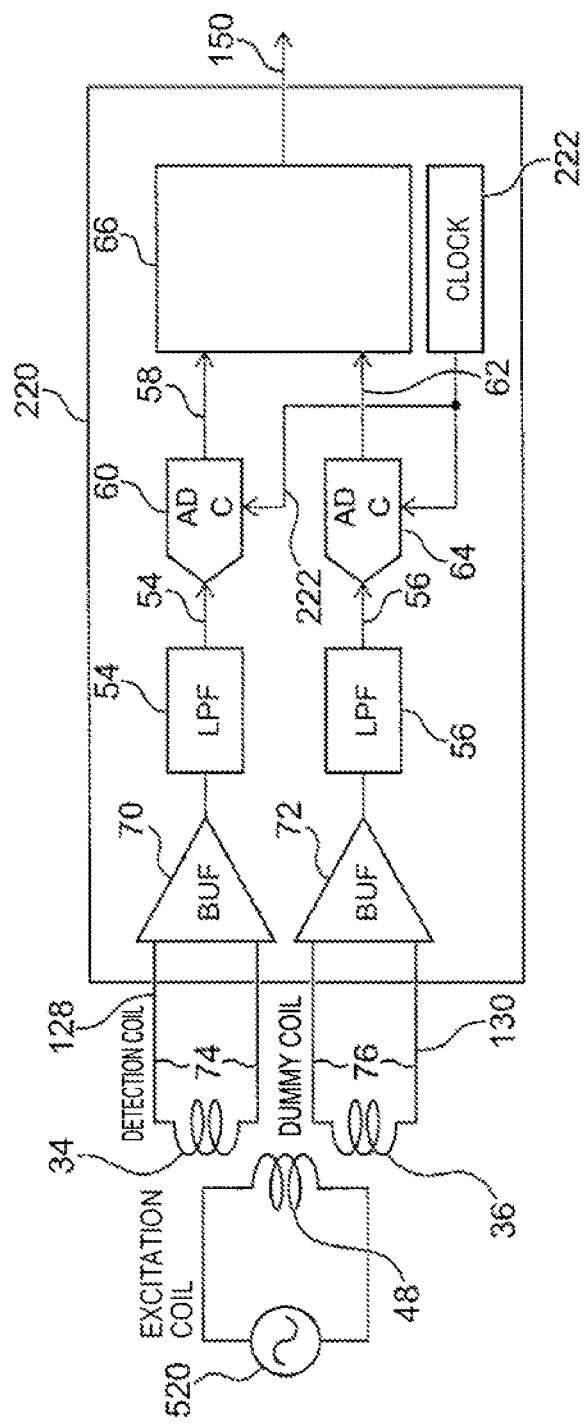
FIG. 7 is a diagram illustrating the present embodiment illustrated in FIG. 6B in more detail.

The present embodiment illustrated in FIG. 6B is illustrated in more detail in FIG. 7. The detection signal processing apparatus 220 processes signals 128 and 130 (detection signals) of the eddy current sensor 210 having an excitation coil 48 configured to form au eddy current in the object to be polished 102 (in particular, a conductive film in the object to be polished 102), a detection coil 34 (first detection coil) configured to detect the eddy current formed in the object to be polished 102, and a dummy coil 36 configured to detect the eddy current. The detection signal processing apparatus 220 includes a converter 60 (first converter) configured to convert a signal 128 (first analog signal) output by the detection coil 34 into a first digital signal 58, and a converter 64 (second converter) configured to convert a signal 130 (second analog signal) output by the dummy coil 36 into a second digital signal 62. The first digital signal 58 and the second digital signal 62 are input to an integrated circuit 66 in the detection signal processing apparatus 220.

In the present embodiment, the first analog signal output by the first detection coil, and the second analog signal output by the dummy coil and/or the third analog signal output (This is described later.) by the second detection coil are directly converted into digital signals. Then, the detection is performed for the digital signal by the digital signal processing circuit. Therefore, conventional bridge circuit and detection circuit which are analog circuits are not used. Since the analog circuits are not used, the instability and noise attributable to the analog circuits can be reduced. Consequently, there can be provided a detection signal processing circuit for an eddy current sensor that is less easily influenced by a change in ambient environment than conventional technologies. The simplification of the circuit, high stability, noise reduction, and simplification of adjustment can be achieved by digitizing the first, second and third analog signals and performing the subsequent processing.

Amplifiers 70 and 72 are provided in an upstream stage of the low-pass filters 54 and 56. The amplifiers 70 and 72 are amplifiers having, for example, an amplification factor of 1 and are disposed for impedance conversion between an input circuit (in this case, on the sides of the coils 34 and 36) and an output circuit (in this case, on the sides of the low-pass filters 54 and 56). It should be noted that the amplification factor of the amplifiers 70 and 72 is not limited to one. The amplifiers 70 and 71 which are buffer amplifiers have characteristics of a high input impedance and a low output impedance, and perform isolation between an upstream-stage circuit and a downstream-stage circuit, that is, isolate the influence of variations in impedance. The impedance when the sides of the coils 34 and 36 are viewed from the low-pass filters 54 and 56 appears to change depending on the presence or absence of the buffer amplifiers, which is referred to as impedance conversion. When the buffer amplifiers are inserted, the influence induced by variations in impedance of the detection coil 34 is not exerted on the low-pass filters 54 and 56, which is referred to as isolation. A fact that the influence is not exerted means that even when the impedance of the detection coil 34 varies, the variation in the impedance when the sides of the coils 34 and 36 are viewed from the low-pass filters 54 and 56 is small. Since the low-pass filters 54 and 56 have a characteristic in that the gain varies when an input impedance varies, the respective buffer amplifiers are provided.

In this way, digitizing the output signals of the detection coil 34 and the dummy coil 36 in the shortest time makes it possible to improve the stability and reduce the noise compared to the case where the output signals of the detection coil 34 and the dummy coil 36 are processed in the analog signal processing circuit.

The signals 128 output by the detection coil 34 flow as differential signals through two signal lines 74. The signals 130 output by the dummy coil 36 flow as differential signals through two signal lines 76. That is, the two signal lines are used as a pair of transmission lines so that the currents flow in directions opposite to each other. Therefore, the magnetic flux is canceled out, and the EMI noise is reduced. In addition, since the noise applied from outside is canceled out, the malfunction is unlikely even when a signal amplitude is small. Thus, applying the signals from the sensor coil as the differential signals can reduce the common node noise.

The converters 60 and 64 perform oversampling. The oversampling means that sampling is performed at a frequency equal to integral multiple times (four times, eight times, or the like) of a required sampling frequency and the obtained data is decimated or interpolated to obtain necessary data and signal. For example, when the frequency of the excitation signal applied to the excitation coil 48 is 16 MHz and the sampling at 32 MHz is required, the sampling is performed at 128 MHz which is eight times of the frequency. The converter 60, 64 AD-converts the signal 128, 130 at a high sampling rate and with high resolution. Performing the oversampling can reduce quantizing noise generated by sampling the signals 128 and 130. With respect to the influence of the oversampling on a dynamic range (DR), an increase in DR (ΔDR) is expressed as ΔDR=10 log$_{10}$ (OSR). Here, the OSR means an oversampling ratio. The oversampling ratio is a ratio of a sampling rate to an output data rate, and in the above-described example, the oversampling ratio is 128 MHz/16 MHz=8. After the oversampling, the averaging is performed to eliminate the noise. With respect to the influence of the averaging to the DR, an increase in DR (ΔDR) under the averaging is expressed as ΔDR=20 log$_{10}$2^(SP^0.25). Here, the SP means the number of data obtained by the oversampling, and in the case of 128 MHz, the SP is expressed as SP=128M.

It should be noted that the influence of the accuracy of AD conversion (the number of bits: n) on the DR is expressed by the following formula.

$$20 \log_{10}(2^n)$$

By the formula, the DR is 72 dB when the accuracy is 12 bits, and the DR is improved to 96 dB when the accuracy is 16 bits.

The detection signal processing apparatus 220 includes an exciter 520 configured to supply, to the excitation coil 48, an excitation signal having jitter not larger than a predetermined value. Although in FIGS. 6 and 7, the exciter 520 is illustrated as being external to the detection signal processing apparatus 220, the exciter 520 is included in the detection signal processing apparatus 220. The exciter 520 uses an oscillator (not illustrated) having ultra-low jitter performance and an ultra low-jitter frequency divider configured to generate a predetermined frequency (e.g., 16 MHz) from a signal generated by the oscillator to generate an excitation signal having the jitter not larger than the predetermined value. Minimizing the jitter can reduce the noise generated when the signals 128 and 130 are quantized. The influence of the jitter on the DR is $20 \log_{10} (2\pi f\sigma)$. Here, σ represents the width of distribution associated with statistical variations in distribution of the magnitude of the jitter. From the formula, when the frequency f of the excitation signal becomes several MHz or higher, the influence of the jitter increases. Since the jitter performance of several ps or less is required to improve the DR, the predetermined value is, for example, several ps.

In this way, the present embodiment illustrated in FIGS. 6 and 7 can suppress the quantizing noise to a lower level and increase the digital resolution to a higher level by combining the oversampling method, the ultra-low jitter excitation circuit, the differential transmission, and the averaging, compared to the case where these methods are not used.

Figure 8:
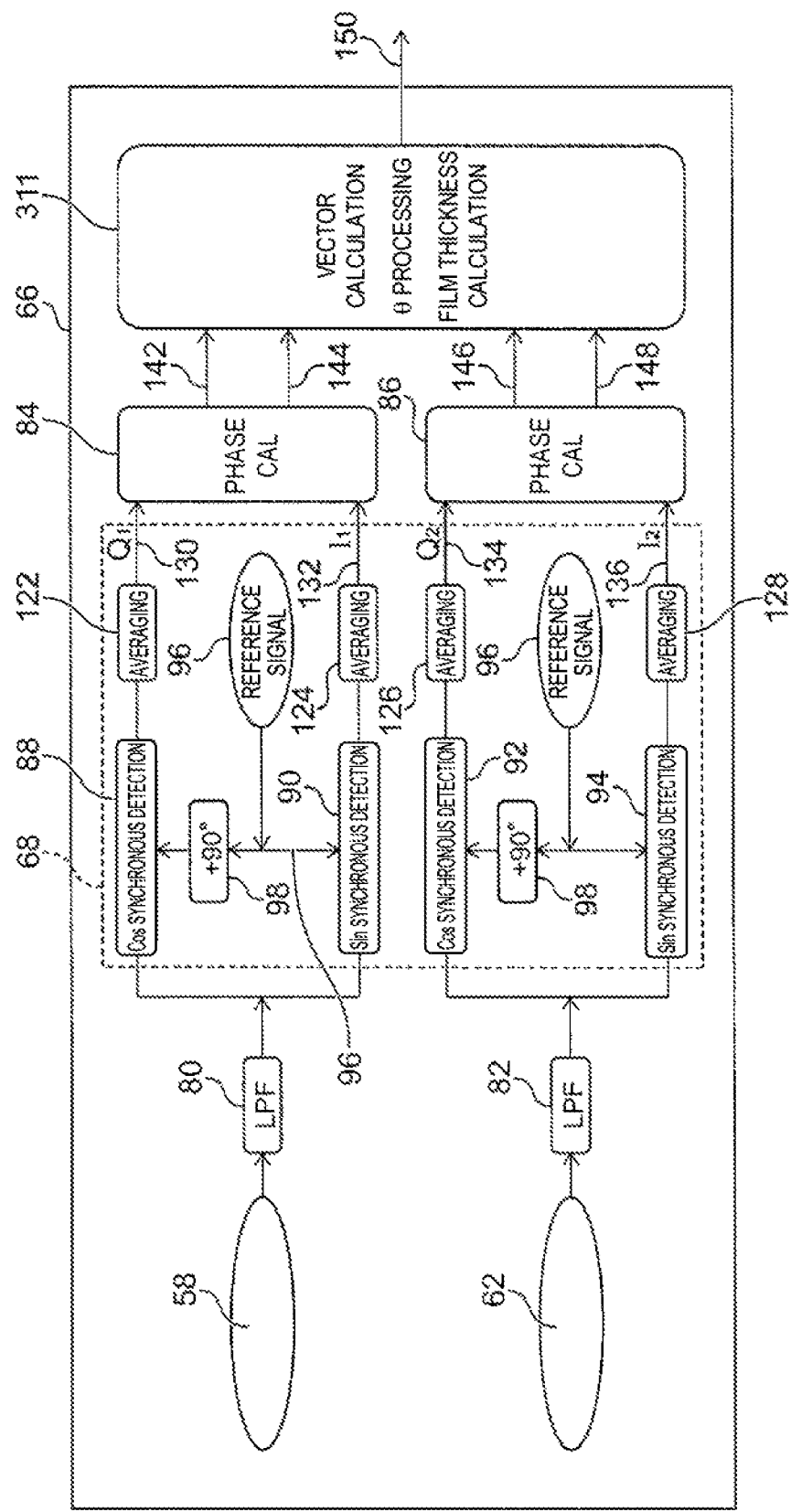
FIG. 8 is a block diagram illustrating a configuration of an integrated circuit.

Next, a configuration of the integrated circuit 66 will be described with reference to FIG. 8. FIG. 8 is a block diagram illustrating the configuration of the integrated circuit 66. The integrated circuit 66 includes a detector 68 which is a digital signal processing circuit configured to detect the first digital signal 58 and the second digital signal 62. In the embodiment of FIG. 8, the processing processes of the first digital signal 58 and the second digital signal 62 which are output from the converter 60 and the converter 64, respectively, are the same as each other in the processes from low-pass filters 80 and 82 to correctors 84 and 86.

The first digital signal 58 and the second digital signal 62 are input to the detector 68 via the low-pass filters 80 and 82, respectively. The detector 68 includes cos synchronous detection circuits 88 and 92, sin synchronous detection circuits 90 and 94, averaging circuits 122, 124, 126 and 128, and reference signal generation modules 96. Cos components (Q components) and sin components (I components) of the first digital signal 58 and the second digital signal 62 are extracted from the detector 68. Here, a phase shift circuit 98 forms two signals of an in-phase component (0°) and a quadrature component (90°) of a reference signal 96 from the reference signal 96. These signals are introduced to the cos synchronous detection circuit 88, 92 and the sin synchronous detection circuit 90, 94, respectively, where the above-described synchronous detection is performed. The cos synchronous detection circuit 88, 92 and the sin synchronous detection circuit 90, 94 are digital multipliers which perform multiplication of the input two signals and output the obtained product.

In the multiplied signal, unnecessary high frequency components are removed from the averaging circuit 122, 124, 126, 128 (a kind of low-pass filter). The signals from which the high frequency components have been removed are Q component output 130, 134 which is a cos synchronous detection output and an I component output 132, 136 which is a sin synchronous detection output. The operations of the cos synchronous detection circuit 88, the sin synchronous detection circuit 90, and the averaging circuits 122 and 124 will be described using formulas. Hereinafter, the output signal of the circuit and the circuit are denoted by the same reference sign. For example, an output signal of the synchronous detection circuit 88 is referred to as an output signal 88. The output signal 80 of the low-pass filter 80 is expressed as $A \sin(\omega t+\theta_A)$, and the output signal 96 of the reference signal generation module 96 is expressed as $B \sin(\omega t+\theta_B)$. The output signal 98 of the phase shift circuit 98 is expressed as $B \cos(\omega t+\theta_B)$.

The output signal 88 of the synchronous detection circuit 88 is expressed as $$A \sin(\omega t+\theta_A) \cdot B \cos(\omega t+\theta_B) = \tfrac{1}{2}AB \cdot \sin(\omega t+\theta_A+\omega t+\theta_B) + \tfrac{1}{2}AB \cdot \sin(\omega t+\theta_A-\omega t-\theta_B)$$

Since a term related to ω(f) in the above-described formula; ½AB·sin(2ωt+θ_A+θ_B) is removed by the averaging circuit 122, the output signal 122 is expressed as ½AB·sin(θ_A−θ_B). If the amplitude and phase of the reference signal 96 are constant, the phase information and amplitude information of the output signal 98 which is a Cos reference signal can be extracted. In this way, Q: quadrature component is obtained by the detection.

The output signal 90 of the synchronous detection circuit 90 is expressed as $$A \sin(\omega t+\theta_A) \cdot B \sin(\omega t+\theta_B) = \tfrac{1}{2}AB \cdot \cos(\omega t+\theta_A+\omega t+\theta_B) + \tfrac{1}{2}AB \cdot \cos(\omega t+\theta_A-\omega t-\theta_B)$$

Since a term related to ω(f) in the above-described formula; ½AB·cos(ωt+θ_A+ωt+θ_B) is removed by the averaging circuit 124, the output signal 122 is expressed as ½AB·cos(θ_A−θ_B). If the amplitude and phase of the reference signal 96 are constant, the phase information and amplitude information of the output signal 96 which is a Sin reference signal can be extracted. In this way, I: in-phase component is obtained by the detection. The phase calibration is performed for the Q component output 130, 134 and the I component output 132, 136 by the corrector 84, 86. A phase calibration method will be described later.

The calculation circuit 311 which is the same as the conventional one performs the vector calculation for the signals 142, 144, 146, and 148 obtained by the phase calibration, to thereby obtain $(Q^2+I^2)^{1/2}$, which is the magnitude of the impedance Z to the first digital signal 58 and the second digital signal 62 from the Q component outputs 142 and 146 and the I component outputs 144 and 148. In addition, the calculation circuit 311 performs θ processing to thereby obtain a phase output ($\theta=\tan^{-1} Q/I$) to the first digital signal 58 and the second digital signal 62 from the Q component outputs 142 and 146 and the I component output 144 and 148 as well. The film thickness calculation is performed to obtain a film thickness 150 from the magnitude of the impedance Z, a phase output, or the like. The calculation circuit 311 is a film thickness calculator configured to obtain a film thickness from the signals 130 to 134 output by the detector 68.

There are various methods of calculating a film thickness. For example, the data such as a relational expression, a table or the like representing a relationship between the film thickness 150 and the magnitude of the impedance Z, phase output, or the like is obtained in advance. After the magnitude of the impedance Z, the phase output, or the like is calculated in the calculation circuit 311, the calculation circuit 311 calculates the film thickness 150 from the data such as the expression, the table or the like to obtain the film thickness 150. The obtained film thickness 150 is output to the endpoint detector 240. The endpoint detector 240 detects a polishing endpoint from the obtained film thickness. The film thickness is transmitted to the polishing apparatus control module 140, and is used for control of each module of the polishing apparatus.

In the embodiment illustrated in FIG. 8, the second digital signal 62 (dummy signal) is used as follows by taking advantage of the fact that the influence of the eddy current generated in the object to be polished 102 is smaller than the influence on the first digital signal 58. For example, in the case where the second digital signal 62 changes during polishing, it is believed that the change is caused by a temperature shift of the excitation signal generated by the excitation coil 48. Then, the second digital signal 62 is used for automatic gain control (AGC) for the excitation signal. In the case where when the temperature before polishing start is not increased, the difference in output between the first digital signal 58 and the second digital signal 62 changes compared to the difference in output before the past polishing start, it is believed that the change is caused by a change in distance (pad thickness) to the object to be polished 102.

Accordingly, the pad thickness can be monitored using the second digital signal 62, and the pad is replaced as necessary.

Figure 9A:
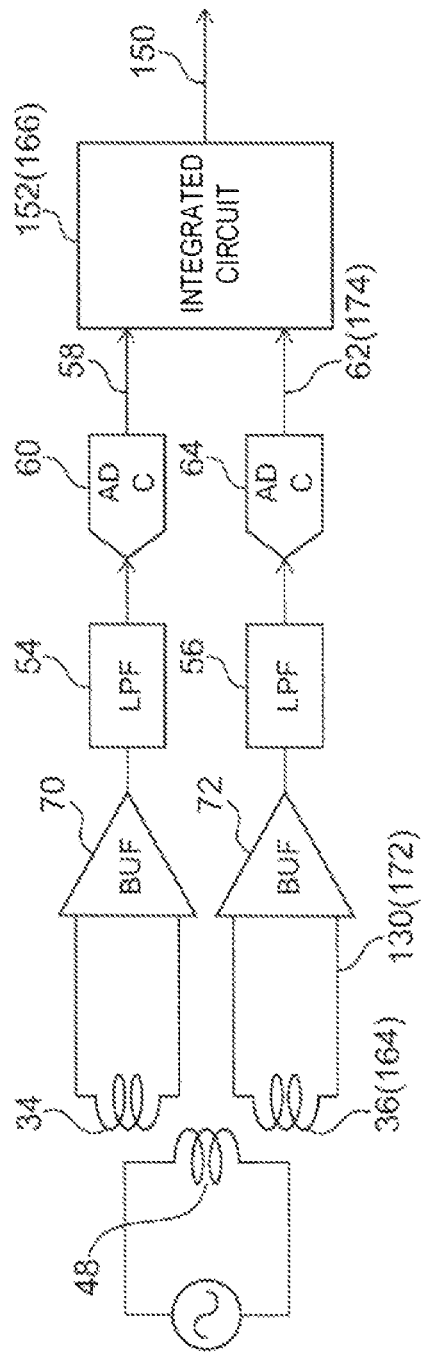
FIGS. 9A-9C are diagrams illustrating a method of using a second digital signal.

Next, a method of using the second digital signal 62, which is different from the method in FIG. 8, will be described with reference to FIG. 9. In the embodiment in FIG. 9, a first digital signal 58 and a second digital signal 62 is input to an integrated circuit 152 in the same manner as the integrated circuit 66 of the embodiment in FIG. 8. However, unlike the embodiment in FIG. 8, in the embodiment in FIG. 9, a difference 154 between the first digital signal 58 and the second digital signal 62 is obtained as illustrated in FIG. 9B. This makes it possible to extract only an amount of change in signal due to the influence of the object to be polished 102. Constant components other than the amount of change are unnecessary components which consume the dynamic range wastefully.

A method of detecting an amount of change will be described. In the first digital signal 58 (detection signal), a signal 156 generated when the object to be polished 102 is present and a signal 158 generated when the object to be polished 102 is not present are different from each other, as illustrated in FIG. 9B. On the other hand, the second digital signal 62 (dummy signal) does not change practically depending on the presence or absence of the object to be polished 102, as illustrated in FIG. 9B. Accordingly, the amount of change can be detected by obtaining a difference between the second digital signal 62 which is not influenced by the object to be polished 102 and the first digital signal 58 which is influenced by the object to be polished 102. When the first digital signal 58 and the second digital signal 62 are input to the integrated circuit 152 (difference circuit) illustrated in FIG. 9A, the integrated circuit 152 first obtains a difference between the first digital signal 58 and the second digital signal 62. Next, the integrated circuit 152 performs, for the difference, the processing similar to the processing by the low-pass filter 80, the synchronous detection circuits 88 and 90, the averaging circuits 122 and 124, and the corrector 84 which are illustrated in FIG. 8. The integrated circuit 152 performs, for the obtained Q component output 142 and I component output 144, the processing similar to the calculation performed by the calculation circuit 311, which is described with reference to FIG. 8, and calculates the film thickness 150.

Figure 9C:
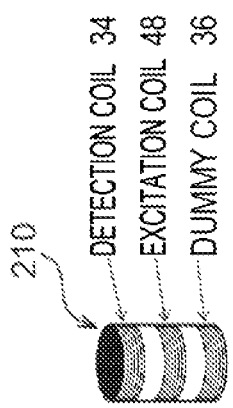
Figure 9B:
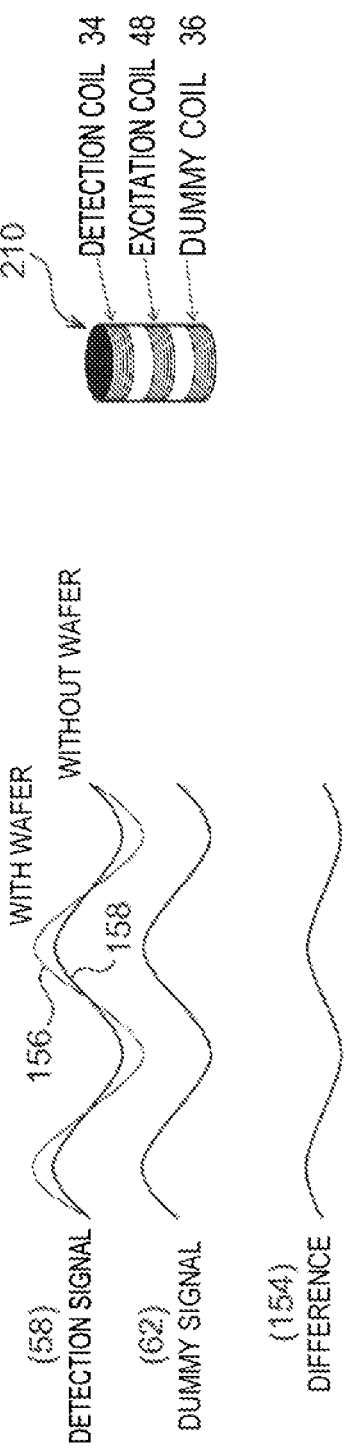

In FIG. 9B, an eddy current sensor 210 illustrated in FIG. 9C is used. In the eddy current sensor 210, the detection coil 34 is provided on the side of the object to be polished 102 and the dummy coil 36 is provided on the side opposite to the object to be polished 102 when viewed from the excitation coil 48. That is, the excitation coil 48 is provided between the detection coil 34 and the dummy coil 36.

Figure 10A:
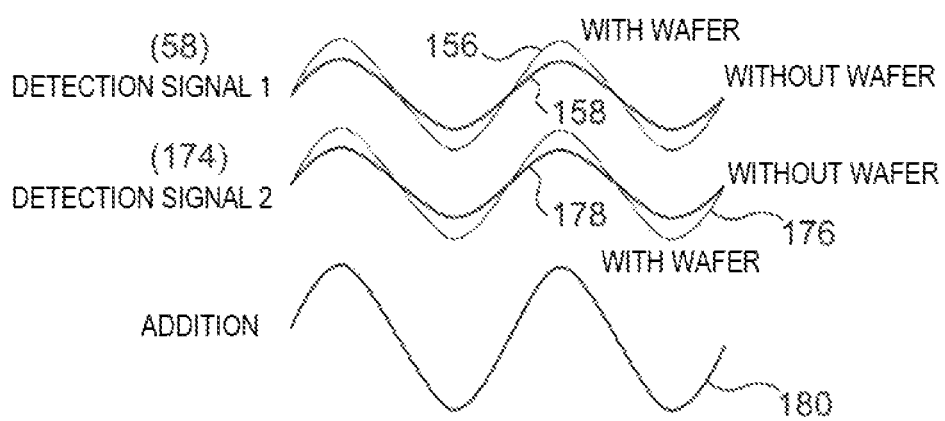
FIGS. 10A, 10B are diagrams illustrating a method of using a third digital signal.
Figure 10B:
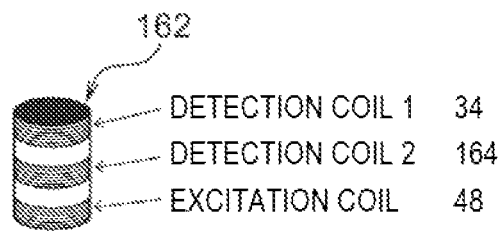

The eddy current sensor may have a configuration illustrated in FIG. 10B. As illustrated in FIG. 10B, in an eddy current sensor 162, the detection coil 34 is provided on the side of the object to be polished 102 and a second detection coil 164 is provided between the detection coil 34 and the excitation coil 48 when viewed from the excitation coil 48 (first detection coil). The eddy current sensor 162 does not include the dummy coil 36. That is, in FIG. 9A, the second detection coil 164 is provided instead of the dummy coil 36, and a third analog signal 172 output by the second detection coil 164 is processed in the same manner by the amplifier 72, the low-pass filter 56, and the converter 64 (third converter) to be converted into a third digital signal 174 as illustrated in FIG. 9A. The third digital signal 174 is input to the integrated circuit 166 (detector), and is detected by the integrated circuit 166.

In the embodiment in FIG. 10, a first digital signal 58 and the third digital signal 174 are input to the integrated circuit 166. In the embodiment in FIG. 10, the first digital signal 58 and the third digital signal 174 are added in the integrated circuit 166 (adder) as illustrated in FIG. 10A. Thus, the amounts of change in eddy current due to the influence of the object to be polished 102 are extracted by the two detection coils 34 and 164, and these amounts are added to increase the level of the overall detection signal.

Next, the advantage of the addition will be described with reference to FIG. 10A. In the first digital signal 58, a signal 156 generated when the object to be polished 102 is present and a signal 158 generated when the object to be polished 102 is not present are different from each other, as illustrated in FIG. 10A. Similarly, also in the third digital signal 174, a signal 176 generated when the object to be polished 102 is present and a signal 178 generated when the object to be polished 102 is not present are different from each other, as illustrated in FIG. 10A. When the first digital signal 58 and the third digital signal 174 are added, a signal 180 is obtained by adding the amounts of change (differences) between the signal 156, 176 when the object to be polished 102 is present and the signal 158, 178 when the object to be polished 102 is not present.

When the first digital signal 58 and the third digital signal 174 are input to the integrated circuit 166 (adder) illustrated in FIG. 9A, the integrated circuit 166 first adds the first digital signal 58 and the third digital signal 174 to obtain a sum of them. Next, the integrated circuit 166 performs, for the sum, the processing similar to the processing by the low-pass filter 80, the synchronous detection circuits 88 and 90, the averaging circuits 122 and 124, and the corrector 84 which are illustrated in FIG. 8. The integrated circuit 166 performs, for the obtained Q component output 142 and I component output 144, the processing similar to the calculation performed by the calculation circuit 311, which is described with reference to FIG. 8, and calculates the film thickness 150.

Figure 11:
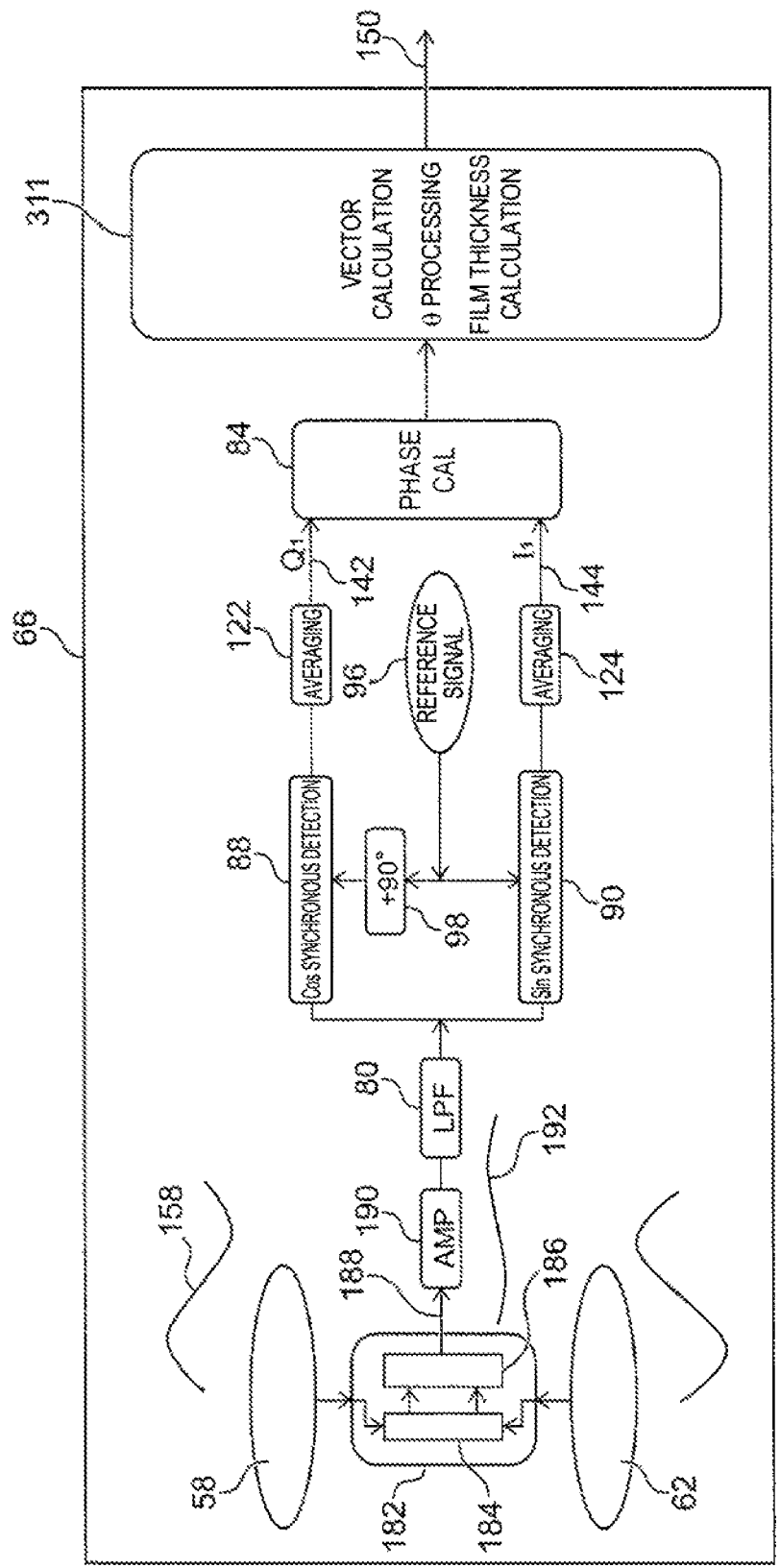
FIG. 11 is a diagram illustrating a bridge calculation circuit.

Next, another embodiment will be described with reference to FIG. 11. In the embodiment in FIG. 11, an integrated circuit 66 includes a bridge calculation circuit 182. The bridge calculation circuit 182 includes an adjuster 184 configured to perform phase adjustment and/or amplitude adjustment between the first digital signal 58 and the second digital signal 62. The adjuster 184 performs phase adjustment processing or amplitude adjustment processing between the first digital signal 58 and the second digital signal 62 so that the phases and/or amplitudes of the first digital signal 58 and the second digital signal 62 are equal to each other at the time of calibration (when the film thickness is zero), as in the resistor bridge circuit 40.

The phase adjustment processing or the amplitude adjustment processing is performed at the time of calibration before polishing, for example. The phase adjustment is performed by detecting a phase difference between the first digital signal 58 and the second digital signal 62 and shifting at least one of the phases of the first digital signal 58 and the second digital signal 62 by an amount corresponding to the detected phase difference so that the phase difference is set to zero. The phase difference is obtained by multiplying the first digital signal 58 by the second digital signal 62 using the circuits similar to the above-described synchronous detection circuit 88 and averaging circuit 122 to process the obtained product in the averaging circuit. When the first digital signal 58 is expressed as $A \sin(\omega t+\theta_A)$ and the second digital signal 62 is expressed as $B \sin(\omega t+\theta_B)$, the product is expressed as $A \sin(\omega t+\theta_A) \cdot B \sin(\omega t+\theta_B)$.

At this time, the output of the averaging circuit is expressed as $\frac{1}{2}AB \cdot \sin(\theta_A-\theta_B)$. When the output of the averaging circuit is expressed as $\frac{1}{2}AB \cdot \sin(\theta_A-\theta_B)$, $\theta_A-\theta_B$ is obtained as the phase difference using an inverse trigonometric function. The amplitude adjustment processing is performed by obtaining a ratio B/A of a maximum value B of an amplitude of the second digital signal 62 to a maximum value A of an amplitude of the first digital signal 58 before or after the phase adjustment and multiplying the reciprocal A/B of the obtained ratio by the second digital signal 62 ($B \sin(\omega t+\theta_B)$), for example.

The bridge calculation circuit 182 includes a difference circuit 186 configured to obtain a difference between the first digital signal 58 and the second digital signal 62 which are output by the adjuster 184. The obtained difference 188 is input to and amplified by an amplifier 190. A reason why the amplifier 190 is provided is because the difference 188 is a signal having a small amplitude. The bridge calculation circuit 182 has a function similar to that of the resistor bridge circuit 40 which is the above-described analog circuit. A difference between the difference calculation illustrated in FIG. 9 and the bridge calculation illustrated in FIG. 11 is in that in the bridge calculation, the adjuster 184 is provided to perform the phase adjustment and/or the amplitude adjustment. The amount of change in signal can be detected more accurately and more largely in the bridge calculation than in a method of simply obtaining the difference.

The output signal of the amplifier 190 is subjected to the processing similar to the processing by the low-pass filter 80, the synchronous detection circuits 88 and 90, the averaging circuits 122 and 124, and the corrector 84 which are illustrated in FIG. 8. The obtained Q component output 142 and I component output 144 are subjected to the processing similar to the calculation performed by the calculation circuit 311, which is described with reference to FIG. 8, and a film thickness 150 is calculated. An advantage of providing the bridge calculation circuit 182 is that a larger amount of change in the output signal detected by the eddy current sensor 210 can be obtained, that is, the dynamic range can be improved. In the case where the bridge calculation circuit 182 is not provided, the magnitude itself of the amplitude of the signal 158 (first digital signal 58) illustrated in FIG. 11 restricts a full range of digital processing. On the other hand, in the case where the bridge calculation circuit 182 is provided, the bridge calculation circuit 182 can extract and amplify only the difference 188 (the signal 192 illustrated in FIG. 11) which is an amount of change, so that the maximum amount of change can be equal to the full range. That is, the dynamic range can be used effectively. This can improve the resolution.

In this respect, a numerical example will be given. In the case where the maximum value of the amplitude which can be processed by the integrated circuit 66 is 66536 (16 bits) and an amount of change in the first digital signal 58 is 500, the amplitude is restricted to 65536 and an amount of change is 500 of 65536 when the bridge calculation circuit 182 is not provided. When the bridge calculation circuit 182 is provided, 500 which is the amount of change is extracted and amplified, whereby 500 of the amount of change can extend to 65536. Accordingly, the resolution can be theoretically increased by 65536/500=about 131 times as an approximation.

Figure 12:
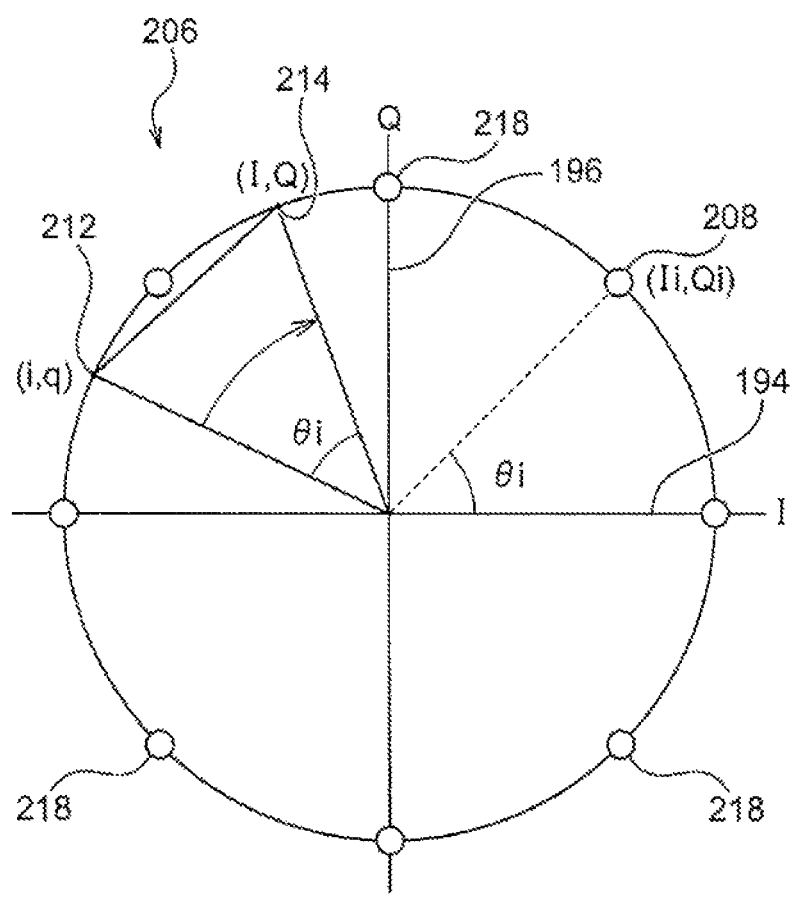
FIG. 12 is a diagram illustrating an operation of a corrector.

Next, the phase calibration performed by the corrector 84, 86 illustrated in FIG. 8 will be described with reference to FIG. 12. The corrector 84 and the corrector 86 have identical functions, and therefore only the corrector 84 will be described with reference to FIGS. 8 and 12. The corrector 84 included in the integrated circuit 66 performs the correction corresponding to a phase difference Θi between the first digital signal 58 and the reference signal 96 for the impedances Q and I obtained by the synchronous detection of the synchronous detection circuits 88 and 90. In an impedance plane 206 in which the resistance component I and the reactance component Q of the impedance correspond to respective axes of a coordinate system having two orthogonal coordinate axes 194 and 196, the phase difference Θi corresponds to a phase angle Θi of the impedance obtained in the reference state.

The phase difference Θi will be described. With respect to the data acquired by perfuming the eight times sampling in the converter 60 as described above, the phase detection calculation is performed between the data and the reference signal 96 in the integrated circuit 66 using the synchronous detection circuits 88 and 90, so that an I value and a Q value are calculated. However, the phase of the input first digital signal 58 is normally shifted from the phase of the reference signal 96. The phase shift is determined in the state in which the detection is not performed by the eddy current sensor 210 immediately after the power source of the polishing apparatus 100 is turned on (i.e., the reference state), and then is constant until the power source is turned off. The phase difference Θi immediately after the power source of the polishing apparatus 100 is turned on, that is, in the reference state is illustrated in FIG. 12. In FIG. 12, the phase difference Θi may have any value from 0 degrees to 360 degrees every time the power source of the polishing apparatus 100 is turned on.

The reference state is not limited to the state in which the detection is not performed by the eddy current sensor 210 immediately after the power source of the polishing apparatus 100 is turned on. The reference state means a state in which reference of an output value of the eddy current sensor 210 can be obtained, such as a state in which the film thickness is zero, a state in which the object to be polished 102 is external to the polishing table 110, a state in which the film thickness is a known certain value, a state in which the calibration of the eddy current sensor 210 is performed, and the like.

The phase difference Θi changes every time the power source of the polishing apparatus 100 is turned on. When the phase difference is not calibrated, it becomes impossible to perform the control based on the relationship between the impedance and the film thickness, and the obtained film thickness. Therefore, it is necessary to eliminate the phase difference Θi, that is, to equalize the phase differences Θi. Therefore, the phase relationship between the first digital signal 58 and the reference signal 96 is calibrated in the following method. When the result obtained by detecting the first digital signal 58 by the synchronous detection circuits 88 and 90 in the reference state shows (Ii, Qi) in FIG. 12, the phase difference Θi is a phase difference Θi at a point 208 showing (Ii, Qi) in the impedance plane 206. The reference state normally refers to when the eddy current sensor 210 is calibrated before polishing start, but the reference state may be provided during polishing to detect the phase difference Θi.

The phase difference Θi obtained in the reference state is held in the corrector 84. The measurement value measured by the eddy current sensor 210 during polishing is processed by the synchronous detection circuits 88 and 90 to obtain an i and a q as the I component output 132 and the Q component output 130 of the impedance. The corrector 84 outputs, as an impedance (I, Q) after correction, a coordinate (I, Q) corresponding to a point 214 obtained by rotating a point 212 corresponding to a coordinate (i, q) in the impedance plane 206 according to a phase angle Θi in a clockwise direction (in a predetermined direction) on the impedance plane 206. The calculation for obtaining the coordinate (I, Q) from the coordinate (i, q) refers to rotation matrix processing, and the specific rotation matrix calculation is expressed by the following equations.

$$I = i\cos(-\Theta i) - q\sin(-\Theta i)$$

$$Q = i\sin(-\Theta 1) + q\cos(-\Theta i)$$

The correction is equivalent to setting the phase difference Θi to zero to equalize the phase differences Θi every tune the power source of the polishing apparatus 100 is turned on. It should be noted that an objective of the corrector 84 is to equalize the phase differences Θi every time the power source of the polishing apparatus 100 is turned on, and therefore the phase difference Θi may be a phase difference other than zero, for example, 90 degrees, 180 degrees, or 270 degrees. The predetermined direction is not limited to the clockwise direction. The predetermined direction may be the counterclockwise direction. This is because the phase differences Θi can be equalized even when the point is rotated in the counterclockwise direction.

Figure 13:
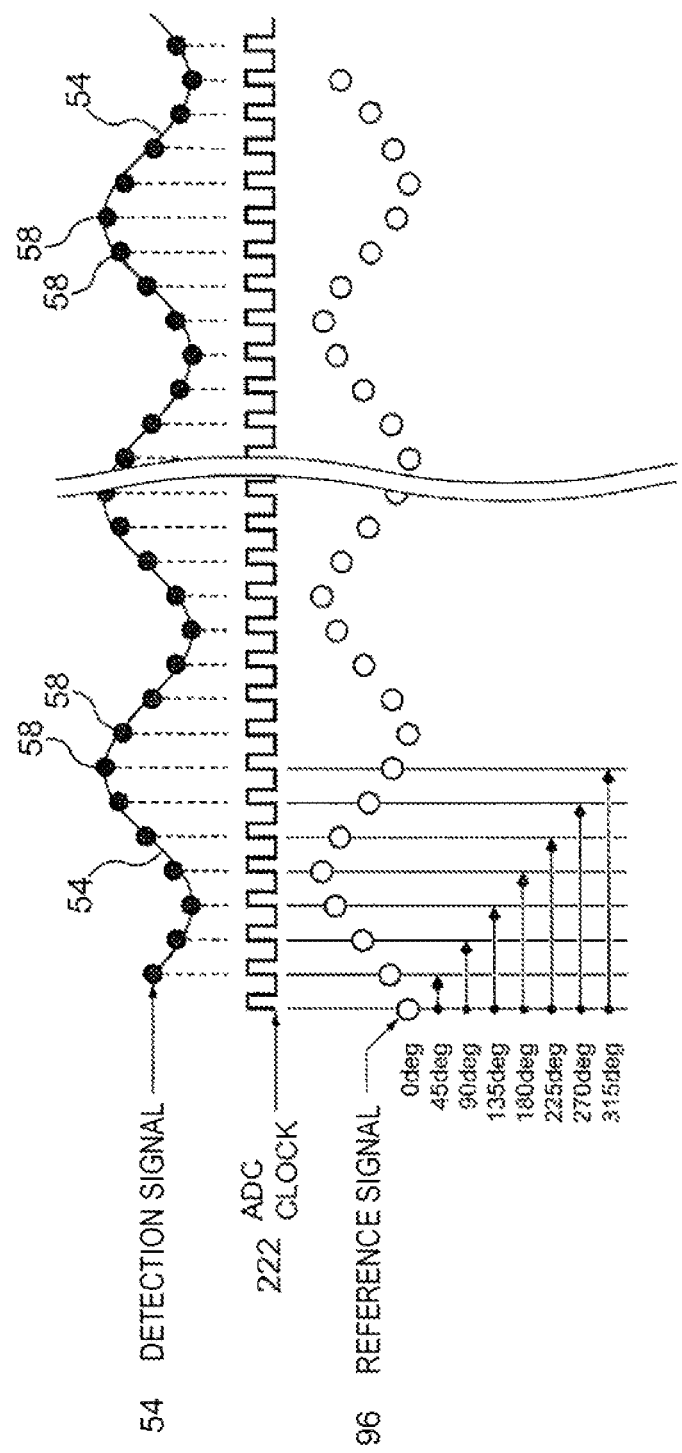
FIG. 13 is a diagram illustrating another method of correcting a phase relationship.
Figure 14:
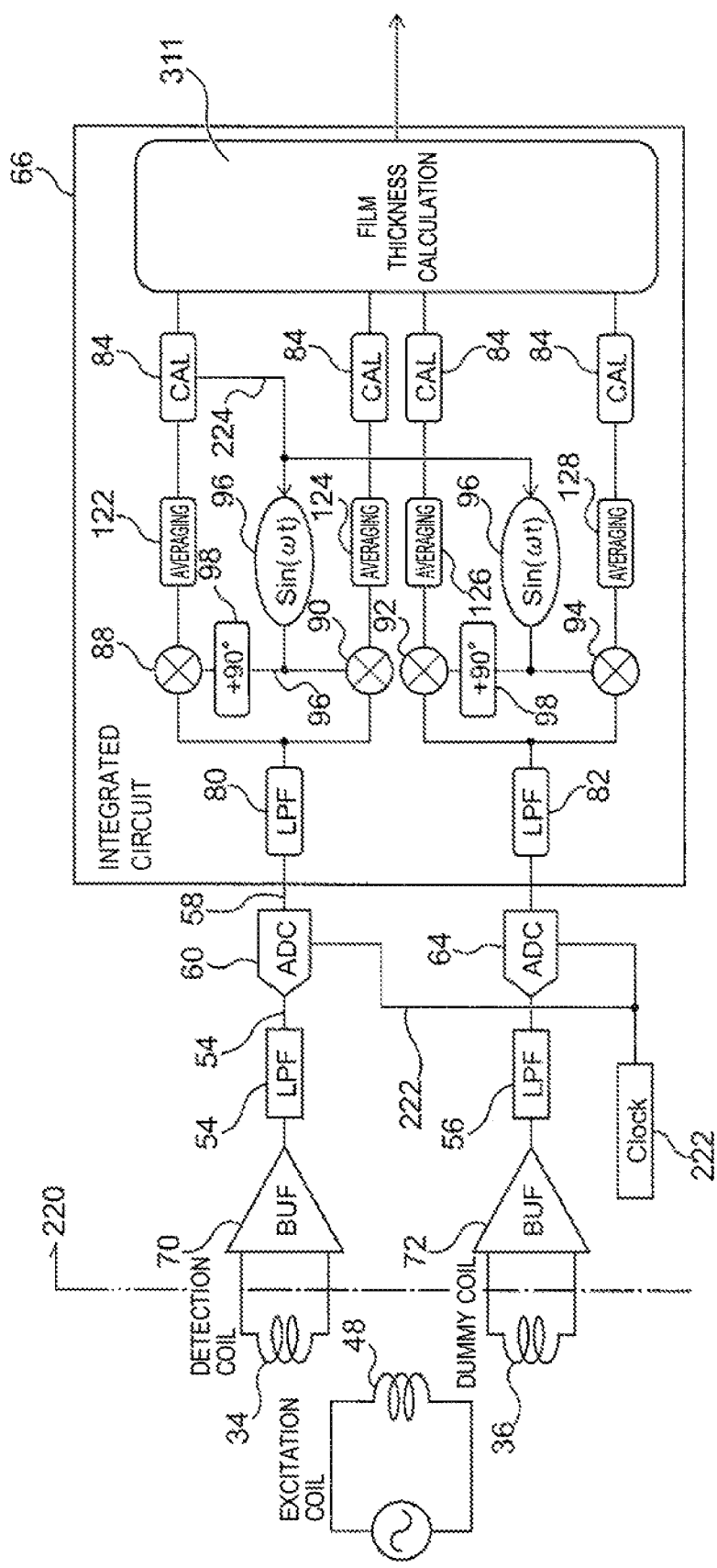
FIG. 14 illustrates both of FIG. 7 and FIG. 8 on the same drawing.

As described above, it is necessary to eliminate the phase difference Θi, that is, to equalize the phase differences Θi. Therefore, another method of correcting the phase relationship between the first digital signal 58 and the reference signal 96 will be described with reference to FIGS. 13 and 14. FIG. 13 is a diagram illustrating another method of correcting a phase relationship. FIG. 14 illustrates both of FIG. 7 and FIG. 8 on the same drawing. However, in FIG. 14, a clock circuit 222 is added. In the method, the above-described eight reference signals 96 used in the digital phase detection calculation are prepared as data in a table format, the reference signals 96 having phases from 0 to 315 degrees which are different by 45 degrees from each other. The phase detection calculation is performed between each of the eight reference signals and the output signal 80 of the low-pass filter 80 in the synchronous detection circuits 88 and 90 and the averaging circuits 122 and 124, so that eight I values and eight Q values are obtained. Next, eight angles Arctan(Q/I) are calculated.

A point where the obtained eight angles Arctan(Q/I) is at its smallest is determined as a phase zero point of the reference signal 96. A reason why the processing is thus performed is as follows. The phase detection calculation is performed between the reference signal 96 in the integrated circuit 66 and each of the first digital signal 58 and the second digital signal 62 which are acquired by performing the eight times oversampling in the converters 60 and 64 as illustrated in FIG. 14, so that I values and Q values are calculated. However, an initial position on an I-Q plane is unspecified due to initial phase differences between the reference signal 96 and each of the first digital signal 58 and the second digital signal 62 or the phase difference when the power source is turned on. This will be described with reference to FIGS. 13 to 14.

Immediately when the polishing apparatus 100 is activated, a clock signal 222 from the clock circuit 222 (see FIG. 14) and the detection signal 54 output by the low-pass filter 54 are output. On the other hand, the time is required until the reference signal 96 is created, and the reference signal 96 has a temporal delay with respect to the clock signal 222 and the detection signal 54. Random phase shifts of eight points (eight points 218 illustrated in FIG. 12) by 45 degrees are produced due to eight times oversampling in the phase relationship between the detection signal 54 and the reference signal 96. As a result, the initial position for calculating the film thickness (may be referred to as a phase difference, or a coordinate reference point) changes every time the power source is turned on. In FIG. 12, the phase difference is obtained accurately to perform the rotation matrix calculation. However, the rotation matrix calculation requires time for calculation. In FIG. 13, the phase difference may be referred to as approximating any of the eight phases from 0 to 315 degrees which are different by 45 degrees from each other. This can reduce the calculation burden.

The synchronous detection circuits 88, the reference signal generation module 96, the averaging circuit 122, and the corrector 84 in the detection signal processing apparatus 220 can detect the phase difference between the first digital signal 58 and the reference signal 96 in the reference state, as described above. The corrector 84 calculates one angle Arctan(Q/I) every time the eight I values and eight Q values are obtained, until the eight angles can be obtained in total. The reference signal 96 when the angle Arctan(Q/I) is at its smallest among the obtained eight angles is determined. The data 224 related to the determined reference signal 96 is output to the reference signal generation module 96. The reference signal generation module 96 configured to generate the reference signal 96 is a signal output circuit configured to output at least one of eight reference signals 96 having phases different from each other in a state other than the reference state, when the data 224 is input thereto. It should be noted that the reference signal generation module 96 sequentially outputs the eight reference signals 96 having phases different from each other (eight phases from 0 to 315 degrees which are different by 45 degrees from each other) to detect the phase difference in the reference state. The phase difference detector configured to detect the phase difference between the first digital signal 58 and the reference signal 96 includes the synchronous detection circuits 88, the reference signal generation module 96, the averaging circuit 122, and the corrector 84. The reference signal generation module 96 outputs one of a plurality of the reference signals 96 so that the phase difference between the first digital signal 58 and the reference signal 96 output by the reference signal generation module 96 is minimized on the basis of the phase difference detected by the phase difference detector in the reference state. That is, the reference signal generation module 96 is a signal output circuit configured to output, in a state other than the reference state, the reference signal 96 such that the phase difference from the reference signal 96 is minimized, among the plurality of reference signals 96. The reference signal generation module 96 may output two or more among the plurality of reference signals 96, in a state other than the reference state. For example, the reference signal generation module 96 may output the above-described reference signal 96 such that the phase difference is minimized, and a reference signal 96 that has advanced in phase by 90 degrees with respect to the above-described reference signal 96 or a reference signal 96 that has been delayed in phase by 90 degrees with respect to the above-described reference signal 96. In the case where the reference signal 96 that has advanced in phase by 90 degrees or the reference signal 96 that has been delayed in phase by 90 degrees is output, it is not necessary to provide the phase shift circuit 98.

Next, comparison between the conventional processing flow of the apparatus illustrated in FIG. 6 and the processing flow in the embodiment illustrated in FIGS. 7 and 8 is illustrated in FIG. 15. FIG. 15A is the conventional processing flow. First, the detection coil 34 and the dummy coil 36 detect the signals 128 and 130, respectively (S10). Next, the balance is adjusted by the resistor bridge circuit 40 so that the superposition (difference) between the detection signal 128 and the dummy signal 131 in the state in which the object to be polished 102 having metal is not in close proximity to the eddy current sensor 210 is zero (S12). Then, when the polishing starts, the detection signal 128 and the dummy signal 131 are amplified by the high frequency amplifier 303 (S14). Next, an in-phase component and a quadrature component are extracted (detected) by the synchronous detection circuits 305 and 306 (S16). The detection result is converted into a direct current by the low-pass filters 307 and 308 (S18).

Next, the direct current is input to the calculation circuit 311, and the analog signal is digitally converted into the digital signal for the first time (S20). The QI measurement values are transmitted to the endpoint detector 240 which is a high-order device (S22). The endpoint detector 240 determines whether a correction value indicating the relationship between the QI measurement values in the calibration stage and the film thickness has already been acquired, that is, whether the calibration has been completed (S24). When the calibration has not been completed, S26 is executed. In S26, the calibration is performed by a calibration wafer, and the adjustment is performed so that the QI values are constant when the film thickness is zero. The adjustment may be referred to as gain adjustment on the software. Then, the processing returns to S10 (S26). In S24, when the calibration has already been completed, S28 is executed. In S28, after the calculation circuit 311 corrects the QI values, the calculation circuit 311 calculates the film thickness and the like, and outputs Q, I, Z, Θ, and the like to the endpoint detector 240. The endpoint detector 240 detects the polishing endpoint on the basis of Q, I, Z, and Θ. The detection method depends on the film type of the object to be polished 102 (S30).

Next, the processing flow in the embodiment illustrated in FIGS. 7 and 8 will be described with reference to FIG. 15B. First, the detection coil 34 and the dummy coil 36 detect the signals 54 and 56, respectively (S50). Next, the analog signal is digitally converted into the digital signal by the converter 60, 64 (S52). In-phase components and quadrature components are extracted (detected) by the synchronous detection circuits 88 to 94. In this stage, the above-described difference calculation and bridge calculation for the detection signal and the dummy signal can be included (S56). The detection result is converted into a direct current which does not contain vibration components such as sinusoidal components, by the low-pass filter 80, 82 (S56).

Next, the corrector 84 determines whether the correction value (initial phase difference, i.e., a phase difference from the reference signal 96) for phase calibration has already been acquired (S58). When the calibration has not been completed, S60 is executed. In S60, the calibration is performed by the calibration wafer, and the initial coordinate (initial phase difference) illustrated in FIG. 12 is acquired or the phase of the reference signal 96 illustrated in FIG. 13 is determined (S60). Next, the phase calibration is performed using the determined correction value (S62).

The QI measurement values are transmitted to the endpoint detector 240 which is a high-order device (S64). The endpoint detector 240 determines whether a correction value indicating the relationship between the QI measurement values in the calibration stage and the film thickness has already been acquired (S66). When the calibration has not been completed, S68 is executed. In S68, the calibration is performed by a calibration wafer, and the adjustment is performed so that the QI values are constant when the film thickness is zero. The adjustment may be referred to as gain adjustment on the software. Then, the processing returns to S50 (S68). In S66, when the calibration has already been completed, S70 is executed. In S70, after the calculation circuit 311 corrects the QI values, the calculation circuit 311 calculates the film thickness and the like, and outputs Q, I, Z, Θ, and the like to the endpoint detector 240. The endpoint detector 240 detects the polishing endpoint on the basis of Q, I, Z, and Θ. The detection method depends on the film type of the object to be polished 102 (S72).

When comparison is made between FIG. 15A and FIG. 15B, the conversion into the distal signal (S20) has been conventionally performed after the adjustment by the resistor bridge circuit 40 (S12) and the detection of the in-phase components and quadrature components by the synchronous detection circuits 305 and 306 (S16). On the other hand, in the present embodiment, the conversion into the digital signal (S52) is performed before step (S54) of performing the processing corresponding to the adjustment and detection processing by the resistor bridge circuit 40. In the present embodiment, the conversion into the digital signal (S52) is performed at the earliest possible stage.

Next, the endpoint detector 240 and the polishing apparatus control module 140 which are illustrated in FIG. 1 will be described. The endpoint detector 240 receives the film thickness 150 obtained by the detection signal processing apparatus 220. The endpoint detector 240 monitors the polishing endpoint on the basis of a change in the film thickness 150. The endpoint detector 240 can detect the polishing endpoint when the film thickness 150 reaches a predetermined value.

The endpoint detector 240 is connected to the polishing apparatus control module 140 configured to perform various control operations associated with the polishing apparatus 100. When detecting the polishing endpoint of the object to be polished 102 on the basis of the film thickness 150, the endpoint detector 240 outputs a signal indicating this fact to the polishing apparatus control module 140. When receiving the signal indicating the polishing endpoint from the endpoint detector 240, the polishing apparatus control module 140 completes the polishing by the polishing apparatus 100.

It should be noted that that operations of the embodiment of the present invention can be performed using the following software and/or system. For example, the system (the polishing apparatus 100) includes a main controller (the polishing apparatus control module 140) configured to control the entirety, and a plurality of sub-controllers each configured to control operation of each module (driving modules 112 and 118, a holding module 116, the detection signal processing apparatus 220). Each of the main controller and the sub-controllers has a CPU, a memory, a storage medium, and software (program) for operating each module, which is stored in the storage medium.

Next, a detection signal processing method of processing a detection signal of the eddy current sensor 210 having the excitation coil 48 configured to form an eddy current in the object to be polished 102, the detection coil 34 configured to detect the eddy current formed in the object to be polished 102, and the dummy coil 36 configured to detect the eddy current, will be described with reference to FIG. 7. In the present method, the first analog signal 54 output by the detection coil 34 is converted into the first digital signal 58 by the converter 60. The second analog signal 56 output by the dummy coil 36 is converted into the second digital signal 62 by the converter 64. The first digital signal 58 and the second digital signal 62 are detected by the integrated circuit 66 in the detection signal processing apparatus 220.

Having described the examples of the embodiments of the present invention above, the aforementioned embodiments of the present invention are given for easy understanding of the present invention and do not limit the present invention. The present invention can be changed and improved without departing from the spirit and scope of the present invention, and the present invention apparently includes equivalents thereof. Also, in a range in which at least a part of the aforementioned problem can be solved or in a range in which at least a part of the effect can be exerted, an arbitrary combination or omission of the constituent elements claimed and described herein are possible.

This application claims priority under the Paris Convention to Japanese Patent Application No. 2021-106668 filed on Jun. 28, 2021. The entire disclosure of Japanese Patent Laid-Open No. 2020-11314 including specification, claims, drawings and summary is incorporated herein by reference in its entirety.

REFERENCE SIGNS LIST

34 . . . Detection coil
36 . . . Dummy coil
48 . . . Excitation coil
58 . . . First digital signal
60, 64 . . . Converter
62 . . . Second digital signal
66 . . . Integrated circuit
68 . . . Detector
84 . . . Corrector
88, 90 . . . Synchronous detection circuit
96 . . . Reference signal
100 . . . Polishing apparatus
102 . . . Object to be polished
152 . . . Integrated circuit
154 . . . Difference
164 . . . Second detection coil
174 . . . Third digital signal
182 . . . Bridge calculation circuit
184 . . . Adjuster
186 . . . Difference circuit
206 . . . Impedance plane
210 . . . Eddy current sensor
220 . . . Detection signal processing apparatus
260 . . . Sensor coil
264 . . . Detection circuit
305 . . . Synchronous detection circuit
306 . . . Synchronous detection circuit

What is claimed is:

1. A detection signal processing apparatus configured to process a detection signal of an eddy current sensor having an excitation coil configured to form an eddy current in an object to be detected, a first detection coil configured to detect the eddy current formed in the object to be detected, and a dummy coil and/or a second detection coil configured to detect the eddy current, wherein the excitation coil is electrically independent from the first detection coil and the dummy coil and/or the second detection coil, the apparatus comprising:
   a first converter configured to convert a first analog signal output by the first detection coil into a first digital signal, the first converter configured such that the first analog signal is input into the first converter without passing through a bridge circuit and a synchronous detection circuit;
   a second converter configured to convert a second analog signal output by the dummy coil into a second digital signal, and/or a third converter configured to convert a third analog signal output by the second detection coil into a third digital signal; and
   a detector which is a digital signal processing circuit configured to detect the first digital signal, and the second digital signal and/or the third digital signal.

2. The detection signal processing apparatus according to claim 1, wherein
   the detector performs synchronous detection using a reference signal to output an obtained impedance,
   the apparatus comprises a corrector configured to perform correction corresponding to a phase difference between the first digital signal and the reference signal with respect to the impedance obtained by the synchronous detection,
   in an impedance plane in which a resistance component and a reactance component of the impedance correspond to respective axes of a coordinate system having two orthogonal coordinate axes, the phase difference corresponds to a phase angle of the impedance obtained in a reference state, and
   the corrector outputs, as an impedance after correction, an impedance corresponding to a point obtained by rotating a point on the impedance plane corresponding to the impedance obtained by the detector, according to the phase angle in a predetermined direction on the impedance plane.

3. The detection signal processing apparatus according to claim 1, wherein
   the detector performs synchronous detection using a reference signal,
   the apparatus comprises a phase difference detector configured to detect a phase difference between the first digital signal and the reference signal, and a signal output circuit configured to output at least one of a plurality of the reference signals having phases different from each other, and
   the signal output circuit is configured to output at least one of a plurality of the reference signals on a basis of the phase difference detected by the phase difference detector.

4. The detection signal processing apparatus according to claim 1, wherein at least one signal of the first analog signal and the second analog signal and/or the third analog signal is a differential signal.

5. The detection signal processing apparatus according to claim 1, wherein
at least one of the first converter, and the second converter and/or the third converter performs oversampling.

6. The detection signal processing apparatus according to claim 1, further comprising:
an exciter configured to supply, to the excitation coil, an excitation signal having jitter not larger than a predetermined value.

7. The detection signal processing apparatus according to claim 1, further comprising:
a difference circuit configured to obtain a difference between the first digital signal and the second digital signal.

8. The detection signal processing apparatus according to claim 7, further comprising:
an adjuster configured to perform phase adjustment and/or amplitude adjustment between the first digital signal and the second digital signal,
wherein the difference circuit obtains a difference between the first digital signal and the second digital signal which are output by the adjuster.

9. The detection signal processing apparatus according to claim 1, further comprising:
an adder configured to add the first digital signal and the third digital signal.

10. A polishing apparatus having the detection signal processing apparatus according to claim 1 and configured to polish the object to be detected, the polishing apparatus comprising:

a polishing mechanism configured to polish the object to be detected;
the eddy current sensor configured to form the eddy current in the object to be detected and detect the formed eddy current to measure a film thickness of the object to be detected; and
a film thickness calculator configured to obtain the film thickness from a signal output by the detector.

11. A detection signal processing method of processing a detection signal of an eddy current sensor having an excitation coil configured to form an eddy current in an object to be detected, a first detection coil configured to detect the eddy current formed in the object to be detected, and a dummy coil and/or a second detection coil configured to detect the eddy current, wherein the excitation coil is electrically independent from the first detection coil and the dummy coil and/or the second detection coil, the method comprising:
converting a first analog signal output by the first detection coil into a first digital signal without passing through a bridge circuit and a synchronous detection circuit;
converting a second analog signal output by the dummy coil into a second digital signal without passing through a bridge circuit and a synchronous detection circuit, and/or converting a third analog signal output by the second detection coil into a third digital signal without passing through a bridge circuit and a synchronous detection circuit; and
detecting the first digital signal, and the second digital signal and/or the third digital signal by a digital signal processing circuit.

\* \* \* \* \*